US012568233B2

(12) United States Patent
Mao et al.

(10) Patent No.: US 12,568,233 B2
(45) Date of Patent: Mar. 3, 2026

(54) SCALABLE ENCODING AND DECODING METHOD AND APPARATUS

(71) Applicant: HUAWEI TECHNOLOGIES CO., LTD., Shenzhen (CN)

(72) Inventors: Jue Mao, Hangzhou (CN); Haitao Yang, Shenzhen (CN); Jing Wang, Beijing (CN); Ze Cui, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 18/223,126

(22) Filed: Jul. 18, 2023

(65) Prior Publication Data

US 2024/0007658 A1     Jan. 4, 2024

Related U.S. Application Data

(63) Continuation of application No. PCT/CN2022/072627, filed on Jan. 19, 2022.

(30) Foreign Application Priority Data

Jan. 19, 2021     (CN) .......................... 202110071775.8

(51) Int. Cl.
*H04N 19/30*          (2014.01)
*H04N 19/13*          (2014.01)
(Continued)

(52) U.S. Cl.
CPC ............. *H04N 19/30* (2014.11); *H04N 19/13* (2014.11); *H04N 19/136* (2014.11); *H04N 19/184* (2014.11); *H04N 19/42* (2014.11)

(58) Field of Classification Search
CPC ...... H04N 19/30; H04N 19/13; H04N 19/136; H04N 19/184; H04N 19/42; H04N 19/103;
(Continued)

(56) References Cited

U.S. PATENT DOCUMENTS

2017/0264902 A1     9/2017  Ye et al.
2020/0160565 A1     5/2020  Ma et al.
(Continued)

FOREIGN PATENT DOCUMENTS

CN          101534432 A      9/2009
CN          102158712 A      8/2011
(Continued)

OTHER PUBLICATIONS

ITU-T H.265 (Nov. 2019), Series H: Audiovisual and Multimedia Systems, Infrastructure of audiovisual services—Coding of moving video, 712 pages.
(Continued)

*Primary Examiner* — Farzana Hossain
(74) *Attorney, Agent, or Firm* — WOMBLE BOND DICKINSON (US) LLP

(57)          ABSTRACT

This application provides a scalable encoding and decoding method and apparatus. The encoding method includes: applying a control signal of a first signal component of a video signal to a first feature map of the first signal component, to obtain a second feature map of the first signal component, where the control signal of the first signal component is obtained through learning; applying a control signal of a second signal component of the video signal to a first feature map of the second signal component, to obtain a second feature map of the second signal component, where the control signal of the second signal component is obtained through learning; and obtaining a bitstream of the video signal based on the second feature map of the first signal component and the second feature map of the second signal component.

17 Claims, 16 Drawing Sheets

10

(51) Int. Cl.

| | | |
|---|---|---|
| *H04N 19/136* | (2014.01) | |
| *H04N 19/184* | (2014.01) | |
| *H04N 19/42* | (2014.01) | |

(58) Field of Classification Search

CPC .............. H04N 19/146; H04N 19/154; H04N 19/172; H04N 19/182; H04N 19/44; H04N 19/70; H04N 19/124; H04N 19/91; H04N 19/186; G06N 3/0455; G06N 3/0464; G06N 3/08; G06N 3/04

See application file for complete search history.

(56) References Cited

U.S. PATENT DOCUMENTS

| | | | | |
|---|---|---|---|---|
| 2020/0177898 | A1 | 6/2020 | Park et al. | |
| 2020/0351492 | A1 | 11/2020 | Teo et al. | |
| 2023/0106778 | A1* | 4/2023 | Karabutov | G06N 3/045 |
| | | | | 706/15 |
| 2023/0262243 | A1* | 8/2023 | Ikonin | H04N 19/13 |
| | | | | 382/239 |
| 2023/0345003 | A1* | 10/2023 | Chen | H04N 19/147 |
| 2024/0056575 | A1* | 2/2024 | Ahn | H04N 19/184 |

FOREIGN PATENT DOCUMENTS

| | | | |
|---|---|---|---|
| CN | 107277520 | A | 10/2017 |
| CN | 108134937 | A | 6/2018 |
| CN | 111800629 | A | 10/2020 |
| CN | 113766246 | A | 12/2021 |
| CN | 113766249 | A | 12/2021 |
| EP | 3836035 | A1 | 6/2021 |
| EP | 4181511 | A2 | 5/2023 |
| JP | H0879748 | A | 3/1996 |
| JP | 2019512938 | A | 5/2019 |
| WO | 2017206826 | A1 | 12/2017 |
| WO | 2019072097 | A1 | 4/2019 |
| WO | 2022159897 | A1 | 7/2022 |

OTHER PUBLICATIONS

ITU-T H.266 (Aug. 2020), Series H: Audiovisual and Multimedia Systems, Infrastructure of audiovisual services—Coding of moving video, 516 pages.

Chen Tong et al: "DeepCoder: A deep neural network based video compression", 2017 IEEE Visual Communications and Image Processing (VCIP), IEEE, Dec. 10, 2017 (Dec. 10, 2017), pp. 1-4, XP033325713.

Ma Siwei et al: "Image and Video Compression With Neural Networks: A Review", IEEE Transactions on Circuits and Systems for Video Technology, vol. 30, No. 6, Apr. 1, 2019 (Apr. 1, 2019), pp. 1683-1698, XP055936502.

Cheng Zhengxue et al: "Deep Convolutional AutoEncoder-based Lossy Image Compression", 2018 Picture Coding Symposium (PCS), IEEE, Jun. 24, 2018 (Jun. 24, 2018), pp. 253-257, XP033398631.

Anonymous: "High Efficiency Video Coding, ITU-T, vol. 265 Series H: Audiovisual and Multimedia Systems Infrastructure of audiovisual services—Coding of moving video", ITU-T Standard,Recommendation, Feb. 1, 2018 (Feb. 1, 2018), pp. 1-672, XP055701552.

Johannes Ball et al, Variational Image Compression With a Scale Hyperprior, arXiv:1802.01436v2 [eess.IV] May 1, 2018, 23 pages.

Ze Cui et al, G-VAE: a Continuously Variable Rate Deep Image Compression Framework, arXiv:2003.02012v1 [eess.IV] Mar. 4, 2020, 8 pages.

Soulef Bouaafia et al, VVC In-Loop Filtering Based on Deep Convolutional Neural Network, Hindawi, Computational Intelligence and Neuroscience, vol. 2021, Article ID 9912839, 9 pages.

Document: JVET-U0079-v2, Hilmi E. Egilmez et al., A DNN Architecture for Intra-Frame Coding in YUV 4:2:0 format with Cross-Component Prediction, Joint Video Experts Team (JVET) of ITU-T SG 16 WP 3 and ISO/IEC JTC 1/SC 29, 21st Meeting, by teleconference, Jan. 6-15, 2021, 8 pages.

ITU-T H.264(Jun. 2019), Series H: Audiovisual and Multimedia Systems, Infrastructure of audiovisual services—Coding of moving video, Advanced video coding for generic audiovisual services, total 836 pages.

* cited by examiner

10

(a) 4:4:4 format     (b) 4:2:2 format     (c) 4:2:0 format

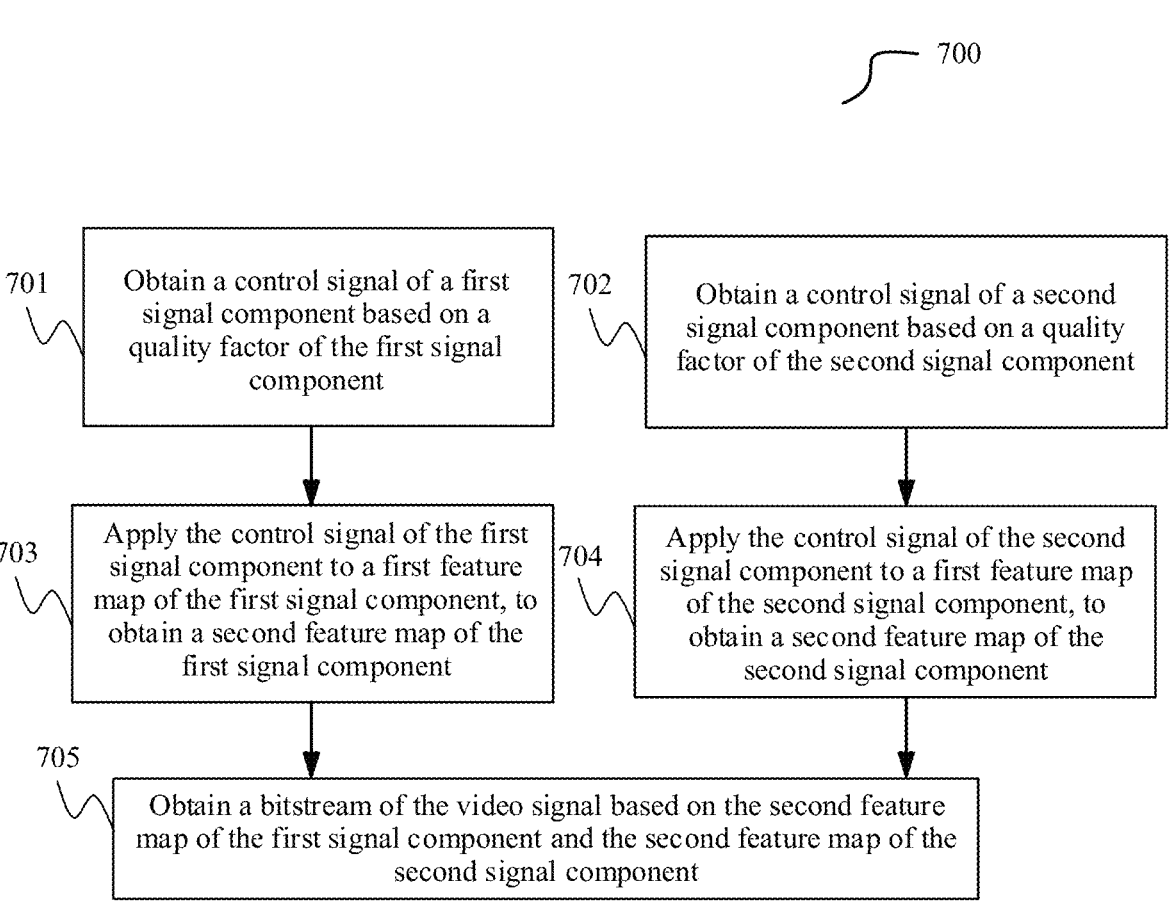

700

701  Obtain a control signal of a first signal component based on a quality factor of the first signal component 702  Obtain a control signal of a second signal component based on a quality factor of the second signal component 703  Apply the control signal of the first signal component to a first feature map of the first signal component, to obtain a second feature map of the first signal component 704  Apply the control signal of the second signal component to a first feature map of the second signal component, to obtain a second feature map of the second signal component 705  Obtain a bitstream of the video signal based on the second feature map of the first signal component and the second feature map of the second signal component

FIG. 7B

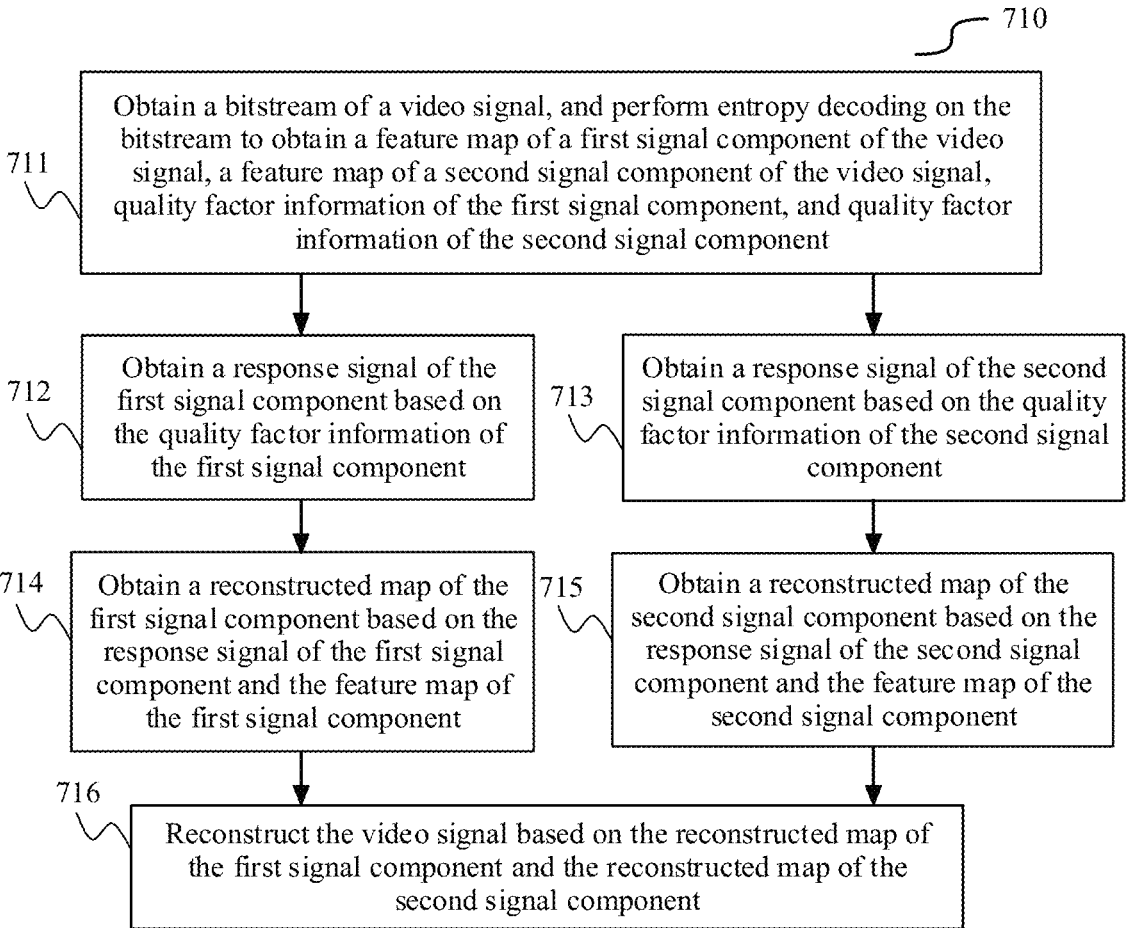

710

711
Obtain a bitstream of a video signal, and perform entropy decoding on the bitstream to obtain a feature map of a first signal component of the video signal, a feature map of a second signal component of the video signal, quality factor information of the first signal component, and quality factor information of the second signal component 712
Obtain a response signal of the first signal component based on the quality factor information of the first signal component 713
Obtain a response signal of the second signal component based on the quality factor information of the second signal component 714
Obtain a reconstructed map of the first signal component based on the response signal of the first signal component and the feature map of the first signal component 715
Obtain a reconstructed map of the second signal component based on the response signal of the second signal component and the feature map of the second signal component 716
Reconstruct the video signal based on the reconstructed map of the first signal component and the reconstructed map of the second signal component

FIG. 7C

SCALABLE ENCODING AND DECODING METHOD AND APPARATUS

CROSS-REFERENCE TO RELATED APPLICATIONS

This application is a continuation of International Application No. PCT/CN2022/072627, filed on Jan. 19, 2022, which claims priority to Chinese Patent Application No. 202110071775.8, filed on Jan. 19, 2021. The disclosures of the aforementioned applications are hereby incorporated by reference in their entireties.

TECHNICAL FIELD

Embodiments of the present application relate to the field of artificial intelligence (AI)-based video or picture compression technologies, and in particular, to a scalable encoding and decoding method and apparatus.

BACKGROUND

Video compression encoding and decoding technologies are widely used in the fields of multimedia services, broadcast, video communication, storage, and the like, for example, broadcast digital television, video transmission over Internet and mobile networks, real-time conversational applications such as video chat and video conferencing, DVDs and Blu-ray discs, video content acquisition and editing systems, and security applications of camcorders.

A large amount of video data is needed to depict even a short video. This may result in difficulties when the data is to be streamed or otherwise communicated over a network with a limited bandwidth capacity. Thus, the video data is generally compressed before being communicated over modem day telecommunications networks. A size of a video may also be a concern when the video is stored on a storage device because memory resources may be limited. Video compression devices often use software and/or hardware at a source to encode the video data prior to transmission or storage, to reduce an amount of data needed to represent a digital video picture. Compressed data is then received at a destination by a video decompression device. With limited network resources and ever increasing demands for higher video quality, compression and decompression technologies need to be improved, to improve a compression rate with little to no sacrifice in picture quality.

In recent years, applying deep learning to the field of end-to-end picture encoding and decoding technologies gradually becomes a trend. In a video encoder and a video decoder that use a hybrid architecture, when entropy encoding is performed on a feature map, it is assumed that a feature value satisfies a zero-mean Gaussian distribution, a variance of the Gaussian distribution is estimated by using a hyperprior structure, to obtain a probability distribution model of the feature value, and an arithmetic encoding module performs entropy encoding on the feature map based on an estimated probability distribution. To enable a decoder side to accurately estimate the probability distribution of the feature map, a module in the hyperprior structure extracts a hidden variable of the estimated probability distribution, and the hidden variable is transferred, through quantization and arithmetic encoding and as side information, to the decoder side. In this mechanism, for an input picture in a YUV format, proportions of bit rates of Y, U, and V components are fixed. However, because pictures have different color characteristics in content, the fixed proportions of bit rates of Y, U, and V components cause large distortions in encoded pictures.

SUMMARY

This application provides a scalable encoding and decoding method and apparatus, to adapt to picture content having different color characteristics.

In this application, scalable encoding and decoding indicate that a video signal is divided into a first signal component and a second signal component, or a video signal is divided into a first signal component, a second signal component, and a third signal component. The first signal component is a Y component, and the second signal component is a UV component, a U component, or a V component. When the second signal component is the U component, the third signal component is the V component. Alternatively, when the second signal component is the V component, the third signal component is the U component.

According to a first aspect, this application provides an encoding method. The encoding method includes: applying a control signal of a first signal component of a video signal to a first feature map of the first signal component, to obtain a second feature map of the first signal component, where the control signal of the first signal component is obtained through learning; applying a control signal of a second signal component of the video signal to a first feature map of the second signal component, to obtain a second feature map of the second signal component, where the control signal of the second signal component is obtained through learning; and obtaining a bitstream of the video signal based on the second feature map of the first signal component and the second feature map of the second signal component.

In an embodiment, the obtaining a bitstream of the video signal based on the second feature map of the first signal component and the second feature map of the second signal component includes: performing entropy encoding on the second feature map of the first signal component and the second feature map of the second signal component, the second feature map of the first signal component and the second feature map of the second signal component that is processed by a neural network, the second feature map of the first signal component that is processed by a neural network and the second feature map of the second signal component, or the second feature map of the first signal component that is processed by a neural network and the second feature map of the second signal component that is processed by a neural network, to obtain the bitstream of the video signal.

In an embodiment, the obtaining a bitstream of the video signal based on the second feature map of the first signal component and the second feature map of the second signal component includes: performing joint processing on the second feature map of the first signal component and the second feature map of the second signal component, to obtain a joint feature map, and performing entropy encoding on the joint feature map to obtain the bitstream of the video signal; performing joint processing on the second feature map of the first signal component and the second feature map of the second signal component that is processed by a neural network, to obtain a joint feature map, and performing entropy encoding on the joint feature map to obtain the bitstream of the video signal; performing joint processing on the second feature map of the first signal component that is processed by a neural network and the second feature map of the second signal component, to obtain a joint feature map, and performing entropy encoding on the joint feature map to obtain the bitstream of the video signal; or performing joint processing on the second feature map of the first signal component that is processed by a neural network and the second feature map of the second signal component that is processed by a neural network, to obtain a joint feature map, and performing entropy encoding on the joint feature map to obtain the bitstream of the video signal.

In an embodiment, the method includes: obtaining the control signal of the first signal component from N candidate first control signals based on a quality factor of the first signal component, where N is an integer greater than 1; and obtaining the control signal of the second signal component from M candidate second control signals based on a quality factor of the second signal component, where M is an integer greater than 1. N and M may be equal or unequal. This is not limited in this application.

In an embodiment, when the first signal component is a Y component, and the second signal component is a UV component, the method includes: generating, through learning, a control signal matrix $\{q_{y1}, q_{y2}, \ldots q_{yi} \ldots q^{yN}\}$ of the Y component and a control signal matrix $\{q_{uv1}, q_{uv2}, \ldots q_{uvj}, \ldots q_{uvM}\}$ of the UV component, where N and M are integers greater than 1; obtaining a control signal $q_{yi}$ of the first signal component based on an index i of a quality factor of the Y component; and obtaining a control signal $q_{uvj}$ of the second signal component based on an index j of a quality factor of the UV component. In this case, the bitstream of the video signal includes the index i of the quality factor of the Y component and the index j of the quality factor of the UV component.

Alternatively, in another embodiment, when the first signal component is a Y component, and the second signal component is a UV component, the method includes: generating, through learning, a control signal matrix $\{q_{c1}, q_{c2}, \ldots q_{ci} \ldots q_{cN}\}$ of the video signal, where c is 2 and represents the Y component and the UV component, and N is an integer greater than 1; and obtaining, based on an index i of a quality factor of the video signal, a control signal $q_{ci}$ that includes the first signal component and the second signal component. In this case, the bitstream of the video signal includes the index i of the quality factor of the video signal.

Alternatively, in still another embodiment implemented by using a fully-connected network, when the first signal component is a Y component, and the second signal component is a UV component, the method includes: using a quality factor of the Y component as an input into the fully-connected network, and outputting a control signal of the Y component; and using a quality factor of the UV component as an input into the fully-connected network, and outputting a control signal of the UV component. In this case, the bitstream of the video signal includes the quality factor of the Y component and the quality factor of the UV component.

In an embodiment, when the second signal component is a U component or a V component, the method further includes: applying a control signal of a third signal component of the video signal to a first feature map of the third signal component, to obtain a second feature map of the third signal component. The control signal of the third signal component is obtained through learning. When the second signal component is a U component, the third signal component is a V component. Alternatively, when the second signal component is a V component, the third signal component is a U component.

In an embodiment, when the first signal component is a Y component, and the second signal component is a U component, the third signal component is a V component, and the method further includes: generating, through learning, a control signal matrix $\{q_{y1}, q_{y2}, \ldots q_{yi} \ldots q_{yN}\}$ of the Y component, a control signal matrix $\{q_{u1}, q_{u2}, \ldots q_{uj} \ldots, q_{uM}\}$ of the U component, and a control signal matrix $\{q_{v1}, q_{v2}, \ldots, q_{vk} \ldots q_{vL}\}$ of the V component, where N, M, and L are integers greater than 1; obtaining a control signal $q_{yi}$ of the first signal component based on an index i of a quality factor of the Y component; obtaining a control signal $q_{uj}$ of the second signal component based on an index j of a quality factor of the U component; and obtaining a control signal $q_{vk}$ of the third signal component based on an index k of a quality factor of the V component. In this case, the bitstream of the video signal includes the index i of the quality factor of the Y component, the index j of the quality factor of the U component, and the index k of the quality factor of the V component.

Alternatively, in another embodiment, when the first signal component is a Y component, and the second signal component is a U component, the third signal component is a V component, and the method further includes: generating, through learning, a control signal matrix $\{q_{c1}, q_{c2}, \ldots q_{ci} \ldots q_{cN}\}$ of the video signal, where c is 3 and represents the Y component, the U component, and the V component, and N is an integer greater than 1; and obtaining, based on an index i of a quality factor of the video signal, a control signal $q_{ci}$ that includes the first signal component, the second signal component, and the third signal component. In this case, the bitstream of the video signal includes the index i of the quality factor of the video signal.

Alternatively, in still another embodiment implemented by using a fully-connected network, when the first signal component is a Y component, and the second signal component is a U component, the third signal component is a V component, and the method further includes: using a quality factor of the Y component as an input into a fully-connected network, and outputting a control signal of the Y component; using a quality factor of the U component as an input into the fully-connected network, and outputting a control signal of the U component; and using a quality factor of the V component as an input into the fully-connected network, and outputting a control signal of the V component. In this case, the bitstream of the video signal includes the quality factor of the Y component, the quality factor of the U component, and the quality factor of the V component.

According to a second aspect, this application provides a decoding method. The decoding method includes: obtaining a bitstream of a video signal; performing entropy decoding on the bitstream to obtain a feature map of a first signal component of the video signal and a feature map of a second signal component of the video signal; obtaining a reconstructed map of the first signal component based on a response signal of the first signal component and the feature map of the first signal component, where the response signal of the first signal component is obtained through learning; obtaining a reconstructed map of the second signal component based on a response signal of the second signal component and the feature map of the second signal component, where the response signal of the second signal component is obtained through learning; and reconstructing the video signal based on the reconstructed map of the first signal component and the reconstructed map of the second signal component.

It should be noted that, in this application, the response signal at the decoder side is similar to the control signal at the encoder side. For ease of distinguishing, the signal at the decoder side is referred to as a response signal, and the signal at the encoder side is referred to as a control signal. The response signal at the decoder side includes a response vector, or includes a response vector and an offset vector.

In an embodiment, the bitstream further includes quality factor information of the first signal component and quality factor information of the second signal component. The quality factor information of the first signal component is a quality factor of the first signal component or an index of the quality factor of the first signal component. The quality factor information of the second signal component is a quality factor of the second signal component or an index of the quality factor of the second signal component. The method further includes: obtaining the response signal of the first signal component based on the quality factor information of the first signal component; and obtaining the response signal of the second signal component based on the quality factor information of the second signal component.

When the quality factor information of the first signal component is the quality factor of the first signal component, a value of the quality factor of the first signal component is one of N. Alternatively, when the quality factor information of the first signal component is the index of the quality factor of the first signal component, a value range of the index of the quality factor of the first signal component is 0 to N-1 or 1 to N, where N is an integer greater than 1.

When the quality factor information of the second signal component is the quality factor of the second signal component, a value of the quality factor of the second signal component is one of M. Alternatively, when the quality factor information of the second signal component is the index of the quality factor of the second signal component, a value range of the index of the quality factor of the second signal component is 0 to M-1 or 1 to M, where M is an integer greater than 1.

In an embodiment, when the first signal component is a Y component, and the second signal component is a UV component, if the bitstream includes an index i of a quality factor of the Y component and an index j of a quality factor of the UV component, the method includes: generating, through learning, a response signal matrix $\{g_{y1}, g_{y2}, \ldots, g_{yi} \ldots g_{yN}\}$ of the first signal component and a response signal matrix $\{g_{uv1}, g_{uv2}, \ldots g_{uvj}, \ldots g_{uvM}\}$ of the second signal component, where N and M are integers greater than 1; obtaining a response signal $g_{yi}$ of the first signal component based on the index i of the quality factor of the Y component; and obtaining a response signal $g_{uvj}$ of the second signal component based on the index j of the quality factor of the UV component.

Alternatively, in another embodiment, when the first signal component is a Y component, and the second signal component is a UV component, if the bitstream includes an index i of a quality factor of the video signal, the method includes: generating, through learning, a response signal matrix $\{g_{c1}, g_{c2}, \ldots g_{ci} \ldots g_{cN}\}$ of the video signal, where c is 2 and represents the Y component and the UV component, and N is an integer greater than 1; and obtaining, based on the index i of the quality factor of the video signal, a response signal $g_{ci}$ that includes the first signal component and the second signal component.

In still another embodiment implemented by using a fully-connected network, when the first signal component is a Y component, and the second signal component is a UV component, if the bitstream includes the quality factor of the first signal component and the quality factor of the second signal component, the method includes: using the quality factor of the Y component as an input into the fully-connected network, and outputting a response signal of the Y component; and using the quality factor of the UV component as an input into the fully-connected network, and outputting a response signal of the UV component.

In an embodiment, when the second signal component is a U component or a V component, the method further includes: performing entropy decoding on the bitstream to obtain a feature map of a third signal component of the video signal; and obtaining a reconstructed map of the third signal component based on a response signal of the third signal component and the feature map of the third signal component. The response signal of the third signal component is obtained through learning. When the second signal component is the U component, the third signal component is the V component. Alternatively, when the second signal component is the V component, the third signal component is the U component. The reconstructing the video signal includes: reconstructing the video signal based on the reconstructed map of the first signal component, the reconstructed map of the second signal component, and the reconstructed map of the third signal component.

In an embodiment, when the first signal component is a Y component, and the second signal component is a U component, the third signal component is a V component, and if the bitstream includes an index i of a quality factor of the Y component, an index j of a quality factor of the U component, and an index k of a quality factor of the V component, the method includes: generating, through learning, a response signal matrix $\{g_{y1}, g_{y2}, \ldots g_{yi} \ldots g_{yN}\}$ of the first signal component, a response signal matrix $\{g_{u1}, g_{u2}, \ldots g_{uj}, \ldots g_{uM}\}$ of the second signal component, and a response signal matrix $\{g_{v1}, g_{v2}, \ldots, g_{vk} \ldots g_{vL}\}$ of the third signal component, where N, M, and L are integers greater than 1; obtaining a response signal $g_{yi}$ of the first signal component based on the index i of the quality factor of the Y component; obtaining a response signal $g_{uj}$ of the second signal component based on the index j of the quality factor of the U component; and obtaining a response signal $g_{vk}$ of the third signal component based on the index k of the quality factor of the V component.

Alternatively, in another embodiment, when the first signal component is a Y component, and the second signal component is a U component, the third signal component is a V component, and if the bitstream includes an index i of a quality factor of the video signal, the method includes: generating, through learning, a response signal matrix $\{g_{c1}, g_{c2}, \ldots g_{ci} \ldots g_{cN}\}$ of the video signal, where c is 3 and represents the Y component, the U component, and the V component, and N is an integer greater than 1; and obtaining, based on the index i of the quality factor of the video signal, a response signal $g_{ci}$ that includes the first signal component, the second signal component, and the third signal component.

Alternatively, in still another embodiment implemented by using a fully-connected network, when the first signal component is a Y component, and the second signal component is a U component, the third signal component is a V component, and if the bitstream includes the quality factor of the first signal component, the quality factor of the second signal component, and a quality factor of the third signal component, the method includes: using the quality factor of the Y component as an input into the fully-connected network, and outputting a response signal of the Y component; using the quality factor of the U component as an input into the fully-connected network, and outputting a response signal of the U component; and using the quality factor of the V component as an input into the fully-connected network, and outputting a response signal of the V component.

According to a third aspect, this application provides an encoder, including a processing circuit, configured to perform the method according to any one of the first aspect and the implementations of the first aspect.

According to a fourth aspect, this application provides a decoder, including a processing circuit, configured to perform the method according to any one of the second aspect and the implementations of the second aspect.

According to a fifth aspect, this application provides a computer program product, including program code. When the program code is executed on a computer or a processor, the computer program product is configured to perform the method according to any one of the first aspect and the second aspect and the implementations of the first aspect and the second aspect.

According to a sixth aspect, this application provides an encoder, including: one or more processors; and a non-transitory computer-readable storage medium, coupled to the processor and storing a program for execution by the processor. The program, when executed by the processor, configures the encoder to perform the method according to any one of the first aspect and the implementations of the first aspect.

According to a seventh aspect, this application provides a decoder, including: one or more processors; and a non-transitory computer-readable storage medium, coupled to the processor and storing a program for execution by the processor. The program, when executed by the processor, configures the decoder to perform the method according to any one of the second aspect and the implementations of the second aspect.

According to an eighth aspect, this application provides a non-transitory computer-readable storage medium, including program code. When the program code is executed by a computer device, the program code is used to perform the method according to any one of the first aspect and the second aspect and the implementations of the first aspect and the second aspect.

According to a ninth aspect, the present application relates to an encoding apparatus, and has a function of implementing an action in the method embodiment according to any one of the first aspect and the implementations of the first aspect. The function may be implemented by hardware, or may be implemented by hardware executing corresponding software. The hardware or the software includes one or more modules corresponding to the foregoing function. In a possible design, the encoding apparatus includes: a first control module, configured to apply a control signal of a first signal component of a video signal to a first feature map of the first signal component, to obtain a second feature map of the first signal component, where the control signal of the first signal component is obtained through learning; a second control module, configured to apply a control signal of a second signal component of the video signal to a first feature map of the second signal component, to obtain a second feature map of the second signal component, where the control signal of the second signal component is obtained through learning; and an encoding module, configured to obtain a bitstream of the video signal based on the second feature map of the first signal component and the second feature map of the second signal component. These modules may perform corresponding functions in the method example according to any one of the first aspect and the implementations of the first aspect. For details, refer to the detailed descriptions in the method example. Details are not described herein again.

According to a tenth aspect, the present application relates to a decoding apparatus, and has a function of implementing an action in the method embodiment according to any one of the second aspect and the implementations of the second aspect. The function may be implemented by hardware, or may be implemented by hardware executing corresponding software. The hardware or the software includes one or more modules corresponding to the foregoing function. In a possible design, the decoding apparatus includes: a decoding module, configured to: obtain a bitstream of a video signal, and perform entropy decoding on the bitstream to obtain a feature map of a first signal component of the video signal and a feature map of a second signal component of the video signal; a first control module, configured to obtain a reconstructed map of the first signal component based on a response signal of the first signal component and the feature map of the first signal component, where the response signal of the first signal component is obtained through learning; a second control module, configured to obtain a reconstructed map of the second signal component based on a response signal of the second signal component and the feature map of the second signal component, where the response signal of the second signal component is obtained through learning; and a reconstruction module, configured to reconstruct the video signal based on the reconstructed map of the first signal component and the reconstructed map of the second signal component. These modules may perform corresponding functions in the method example according to any one of the second aspect and the implementations of the second aspect. For details, refer to the detailed descriptions in the method example. Details are not described herein again.

In conventional end-to-end picture coding, during learning and optimization of a specific network, optimization is performed based on fixed weight values of Y, U, and V components. Therefore, proportions of bit rates of Y, U, and V components are fixed. Because different pictures have different color characteristics, fixed bit rate allocation causes poor encoding performance of some video pictures. In the foregoing aspects of this application, a control signal of each signal component is used to control a feature map of the corresponding signal component, to support bit rate allocation among Y, U, and V components, and adapt to picture content having different color characteristics.

Details of one or more embodiments are set forth in the accompanying drawings and the description below. Other features, objectives, and advantages will be apparent from the description, accompanying drawings, and claims.

BRIEF DESCRIPTION OF DRAWINGS

The following describes the accompanying drawings used in embodiments of this application.

FIG. 7B is an embodiment of an encoding method based on FIG. 7A;

FIG. 7C is an embodiment of a decoding method based on FIG. 7A;

DESCRIPTION OF EMBODIMENTS

Figure 1A:
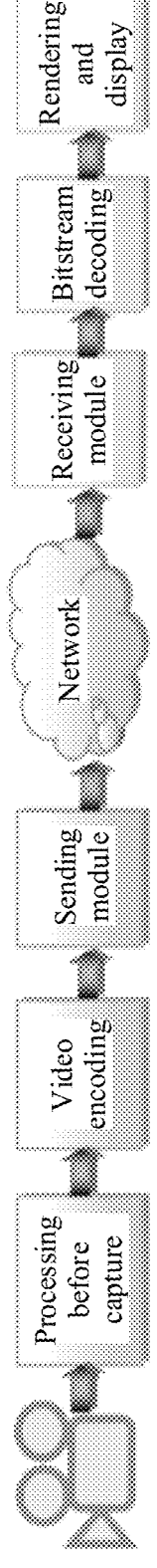
FIG. 1A is a block diagram showing an example of a video coding system configured to implement embodiments of the present application, where the system encodes or decodes a video picture based on deep learning.

Embodiments of this application provide an AI-based video picture compression technology, and specifically provide a scalable encoding and decoding method and apparatus, to improve a conventional end-to-end hybrid video coding system.

Video coding typically refers to processing of a sequence of pictures, where the sequence of pictures forms a video or a video sequence. In the field of video coding, the terms "picture", "frame", and "image" may be used as synonyms. Video coding (or coding in general) includes two parts: video encoding and video decoding. Video encoding is performed at a source, and typically includes processing (for example, by compression) an original video picture to reduce an amount of data required for representing the video picture (for more efficient storage and/or transmission). Video decoding is performed at a destination, and typically includes inverse processing in comparison with processing of an encoder to reconstruct a video picture. Embodiments referring to "coding" of video pictures (or pictures in general) shall be understood to relate to "encoding" or "decoding" of video pictures or respective video sequences. A combination of an encoding part and a decoding part is also referred to as encoding and decoding (CODEC).

In a case of lossless video coding, an original video picture can be reconstructed. In other words, a reconstructed video picture has same quality as the original video picture (it is assumed that no transmission loss or other data loss occurs during storage or transmission). In a case of lossy video coding, further compression is performed through, for example, quantization, to reduce an amount of data required for representing a video picture, and the video picture cannot be completely reconstructed at a decoder. In other words, quality of a reconstructed video picture is lower or poorer than that of the original video picture.

Several video coding standards are used for "lossy hybrid video coding" (that is, spatial and temporal prediction in a pixel domain is combined with 2D transform coding for applying quantization in a transform domain). Each picture of a video sequence is typically partitioned into a set of non-overlapping blocks, and coding is typically performed at a block level. To be specific, at an encoder, a video is usually processed and encoded at a block (video block) level. For example, a prediction block is generated through spatial (intra) prediction and temporal (inter) prediction, the prediction block is subtracted from a current block (block being processed or to be processed) to obtain a residual block, and the residual block is transformed in the transform domain and quantized to reduce an amount of data that is to be transmitted (compressed). At a decoder, an inverse processing part relative to the encoder is applied to an encoded block or a compressed block to reconstruct the current block for representation. Furthermore, the encoder needs to duplicate processing steps of the decoder, so that the encoder and the decoder generate identical predictions (for example, intra- and inter-predictions) and/or reconstructed pixels for processing, that is, coding subsequent blocks.

In the following embodiments of a video coding system 10, an encoder 20 and a decoder 30 are described based on FIG. 1B to FIG. 3.

FIG. 1A is a schematic block diagram showing an example coding system. As shown in FIG. 1A, after a video capture device captures a video, a series of pre-processing is performed, and then a processed video is compressed and encoded, to obtain an encoded bitstream. The bitstream is sent by a sending module to a receiving module over a transmission network, and can be rendered and displayed after being decoded by the decoder. In addition, the video encoded bitstream can also be directly stored.

Figure 1B:
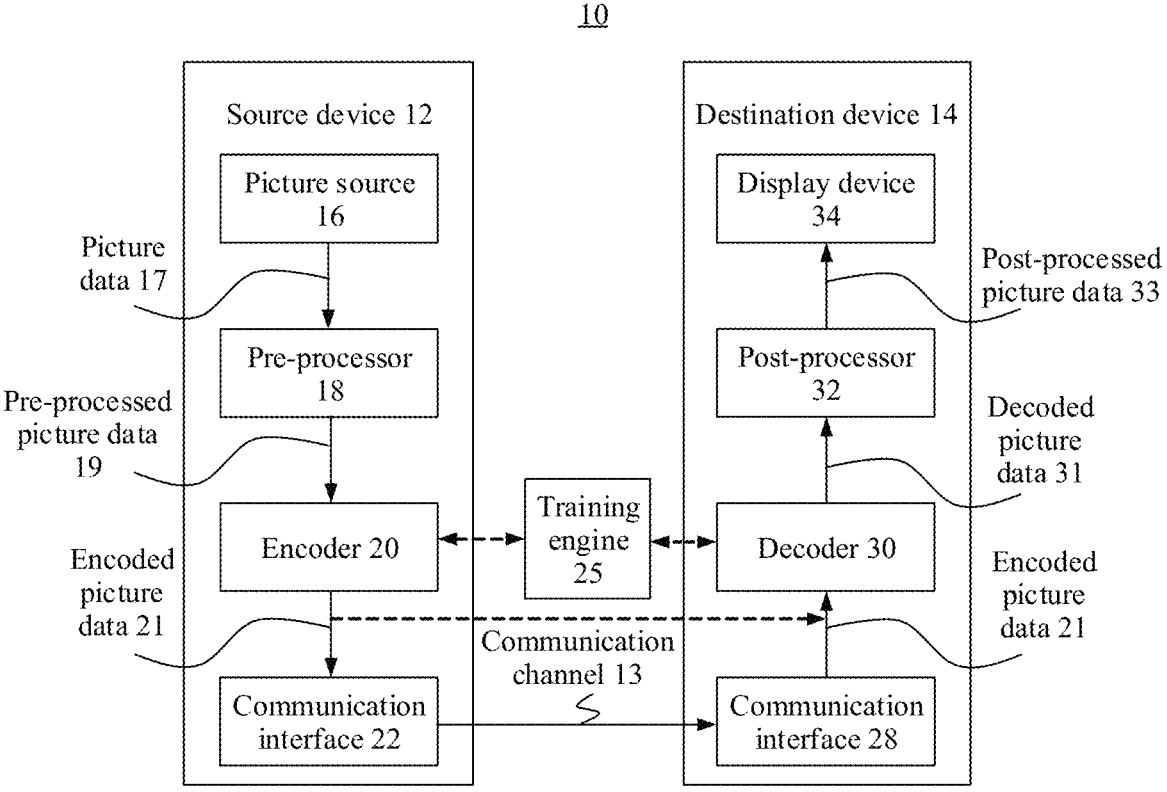
FIG. 1B is a block diagram showing another example of a video coding system configured to implement embodiments of the present application, where the system encodes or decodes a video picture based on deep learning.

FIG. 1B is a schematic block diagram showing an example coding system 10, for example, a video coding system 10 (or a coding system 10 for short) that may utilize techniques of this application. The video encoder 20 (or the encoder 20 for short) and the video decoder 30 (or the decoder 30 for short) of the video coding system 10 represent examples of devices that may be configured to perform techniques in accordance with various examples described in this application.

As shown in FIG. 1B, the coding system 10 includes a source device 12. The source device 12 is configured to provide encoded picture data 21, for example, an encoded picture, to a destination device 14 configured to decode the encoded picture data 21.

The source device 12 includes the encoder 20, and may additionally, that is, optionally, include a picture source 16, a pre-processor (or a pre-processing unit) 18, for example, a picture pre-processor, and a communication interface (or a communication unit) 22.

The picture source 16 may include or be any type of picture capturing device, for example for capturing a real-world picture, and/or any type of a picture generating device, for example a computer-graphics processor for generating a computer animated picture, or any type of other device for obtaining and/or providing a real-world picture, a computer generated picture (for example, screen content, a virtual reality (VR) picture), and/or any combination thereof (for example, an augmented reality (AR) picture). The picture source may be any type of memory or storage storing any of the aforementioned pictures.

To distinguish pictures (or picture data) during processing performed by the pre-processor (or the pre-processing unit) 18, the picture (or picture data) 17 may also be referred to as an original picture (or original picture data) 17.

The pre-processor 18 is configured to receive the (original) picture data 17 and to perform pre-processing on the picture data 17 to obtain a pre-processed picture (or pre-processed picture data) 19. Pre-processing performed by the pre-processor 18 may include, for example, trimming, color format conversion (for example, from RGB to YCbCr), color correction, or de-noising. It can be understood that the pre-processing unit 18 may be an optional component.

The video encoder (or the encoder) 20 is configured to receive the pre-processed picture data 19 and provide encoded picture data 21 (further details are described below, for example, based on FIG. 2).

The communication interface 22 of the source device 12 may be configured to: receive the encoded picture data 21, and send the encoded picture data 21 (or any further processed version thereof) through a communication channel 13 to another device, for example, the destination device 14 or any other device, for storage or direct reconstruction.

The destination device 14 includes the decoder 30, and may additionally, that is, optionally, include a communication interface (or a communication unit) 28, a post-processor (or a post-processing unit) 32, and a display device 34.

The communication interface 28 of the destination device 14 is configured to: receive the encoded picture data 21 (or any further processed version thereof), for example, directly from the source device 12 or from any other source device, for example, a storage device, for example, an encoded picture data storage device, and provide the encoded picture data 21 to the decoder 30.

The communication interface 22 and the communication interface 28 may be configured to send or receive the encoded picture data (or the encoded data) 21 over a direct communication link between the source device 12 and the destination device 14, for example, a direct wired or wireless connection, or over any type of network, for example, a wired or wireless network or any combination thereof, or any type of private and public network, or any kind of combination thereof.

The communication interface 22 may be, for example, configured to package the encoded picture data 21 into an appropriate format, for example, a packet, and/or process the encoded picture data through any type of transmission encoding or processing for transmission over a communication link or communication network.

The communication interface 28, corresponding to the communication interface 22, may be, for example, configured to receive transmitted data and process the transmitted data through any type of corresponding transmission decoding or processing and/or de-packaging to obtain the encoded picture data 21.

The communication interface 22 and the communication interface 28 each may be configured as unidirectional communication interface as indicated by an arrow that is for the communication channel 13 in FIG. 1B and that points from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or the decoder) 30 is configured to: receive the encoded picture data 21, and provide a decoded picture (or decoded picture data) 31 (further details are described below, for example, based on FIG. 3).

The post-processor 32 is configured to post-process the decoded picture data 31 (also referred to as reconstructed picture data), for example, the decoded picture, to obtain post-processed picture data 33, for example, a post-processed picture. Post-processing performed by the post-processing unit 32 may include, for example, color format conversion (for example, from YCbCr to RGB), color correction, trimming, or re-sampling, or any other processing, for example, for preparing the decoded picture data 31 for display, for example, by the display device 34.

The display device 34 is configured to receive the post-processed picture data 33 for displaying the picture, for example, to a user or viewer. The display device 34 may be or include any type of display for representing a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

The coding system 10 further includes a training engine 25. The training engine 25 is configured to train the encoder 20 or the decoder 30 to perform scalable encoding and decoding on the reconstructed picture.

In this embodiment of this application, training data includes a training matrix set. The training matrix set includes a luma matrix before filtering, a quantization step matrix, and a luma matrix after filtering of a picture block. A pixel at a corresponding location in the luma matrix before filtering corresponds to a luma value before filtering of a pixel at a corresponding location in the corresponding picture block. A pixel at a corresponding location in the quantization step matrix corresponds to a luma value of a pixel at a corresponding location in the corresponding picture block. A pixel at a corresponding location in the luma matrix after filtering corresponds to a luma value after filtering of a pixel at a corresponding location in the corresponding picture block.

For example, a plurality of matrices in the training matrix set may be input into the training engine 25 in a manner shown in FIG. 6a to FIG. 6c. As shown in FIG. 6a, a plurality of matrices in the training matrix set are directly input into the training engine 25, and the plurality of matrices are all two-dimensional matrices. As shown in FIG. 6b, some or all of a plurality of matrices in the training matrix set are selected for combination to obtain a multidimensional matrix, and then the multidimensional matrix is input into the training engine 25. As shown in FIG. 6c, some or all of a plurality of matrices in the training matrix set are selected for addition (or multiplication) to obtain a two-dimensional matrix, and then the two-dimensional matrix is input into the training engine 25.

The training data may be stored in a database (not shown in the figure), and the training engine 25 obtains a target model (for example, may be a neural network for scalable encoding and decoding) through training based on the training data. It should be noted that a source of the training data is not limited in this embodiment of this application.

For example, the training data may be obtained from a cloud or another place to perform model training.

The training engine 25 trains the target model so that a pixel before filtering are close to an original pixel value. In each training process, a small batch size may be 64 pictures, an initial learning rate may be 1e-4, and a step size may be 10. The training data may be data generated by the encoder based on different QP quantization parameter settings. The target model can be used to implement the scalable encoding and decoding method provided in this embodiment of this application. To be specific, a reconstructed picture or picture block is input into the target model after related pre-processing, to obtain a filtered picture or picture block. The target model in this embodiment of this application may be specifically a filtering network. The following describes the target model in detail with reference to FIG. 7A to FIG. 7D.

The target model obtained through training by the training engine 25 may be applied to the coding system 10, for example, applied to the source device 12 (for example, the encoder 20) or the destination device 14 (for example, the decoder 30) shown in FIG. 1B. The training engine 25 may obtain the target model through training on the cloud, and the coding system 10 downloads the target model from the cloud and uses the target model. Alternatively, the training engine 25 may obtain the target model through training on the cloud and use the target model, and the coding system 10 directly obtains a processing result from the cloud.

Although FIG. 1B depicts the source device 12 and the destination device 14 as separate devices, embodiments of devices may also include the source device 12 and the destination device 14 or functionalities of the source device 12 and the destination device 14, that is, the source device 12 or corresponding functionality and the destination device 14 or corresponding functionality. In such embodiments, the source device 12 or corresponding functionality and the destination device 14 or corresponding functionality may be implemented by using same hardware and/or software or by separate hardware and/or software or any combination thereof.

According to the description, existence and (accurate) division of the different units or functions within the source device 12 and/or the destination device 14 as shown in FIG. 1B may vary depending on the actual device and application.

Figure 1C:
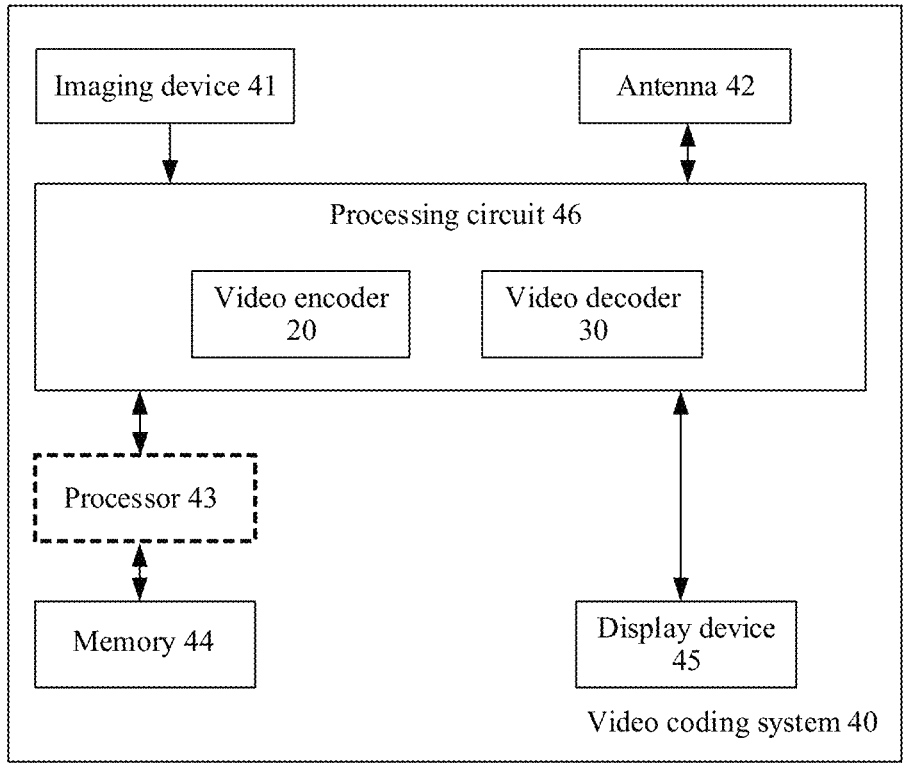
FIG. 1C is a block diagram showing still another example of a video coding system configured to implement embodiments of the present application, where a video encoder and/or a video decoder encodes or decodes a video picture based on deep learning.
Figures 5, 6:
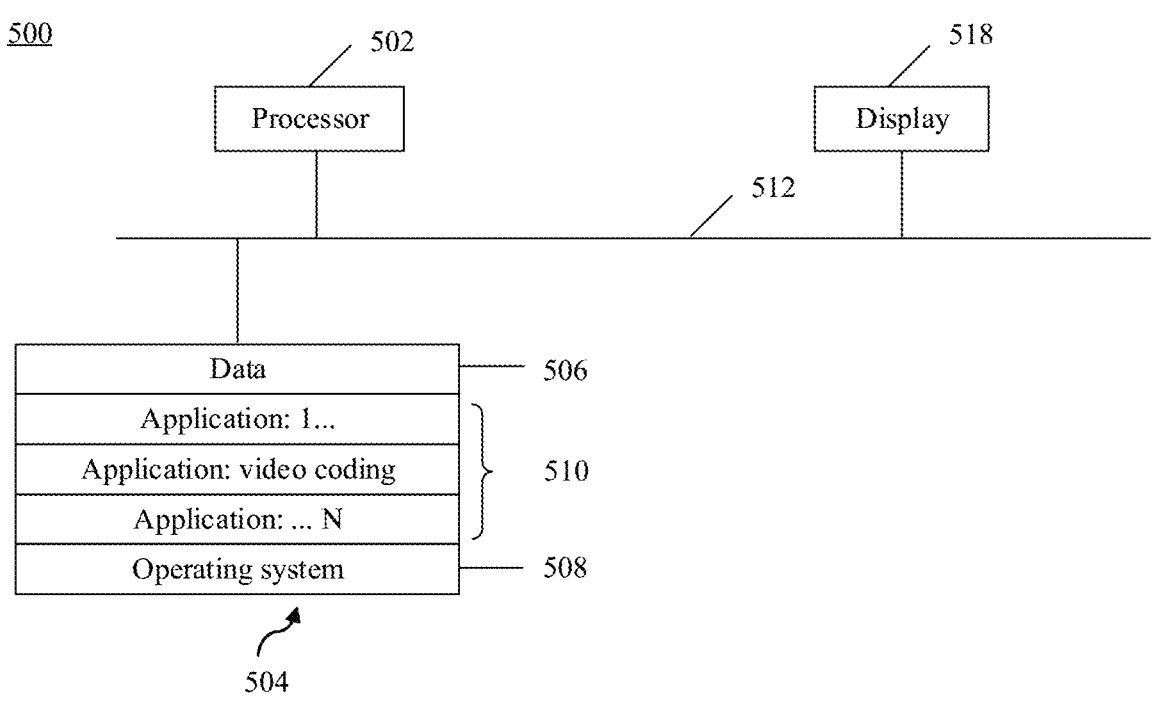
FIG. 5 is a schematic block diagram of another video coding apparatus configured to implement embodiments of the present application.
FIG. 6 is a schematic diagram of a YUV format.

The encoder 20 (for example, the video encoder 20) or the decoder 30 (for example, the video decoder 30) or both the encoder 20 and the decoder 30 may be implemented via a processing circuit as shown in FIG. 1C, such as one or more microprocessors, digital signal processors (DSPs), application-specific integrated circuits (ASICs), field-programmable gate arrays (FPGAs), discrete logic, hardware, video coding dedicated processors or any combinations thereof. The encoder 20 may be implemented via the processing circuit 46 to embody the various modules as discussed with respect to the encoder 20 shown in FIG. 2 and/or any other encoder system or subsystem described herein. The decoder 30 may be implemented via the processing circuit 46 to embody the various modules as discussed with respect to the decoder 30 shown in FIG. 3 and/or any other decoder system or subsystem described herein. The processing circuit 46 may be configured to perform various operations as discussed later. As shown in FIG. 5, if some techniques are implemented in software, a device may store instructions for the software in a suitable non-transitory computer-readable storage medium, and may execute the instructions in hardware by using one or more processors to perform the techniques of the present application. Either of the video encoder 20 and the video decoder 30 may be integrated as part of a combined encoder/decoder (CODEC) in a single device, for example, as shown in FIG. 1C.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any type of operating system. In some cases, the source device 12 and the destination device 14 may be equipped with a component for wireless communication. Therefore, the source device 12 and the destination device 14 may be wireless communication devices.

In some cases, the video coding system 10 shown in FIG. 1B is merely an example and the techniques of this application are applicable to video coding settings (for example, video encoding or video decoding) that do not necessarily include any data communication between the encoding and decoding devices. In other examples, data is retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with one another, but simply encode data to the memory and/or retrieve data from the memory and decode the data.

Figure 2:
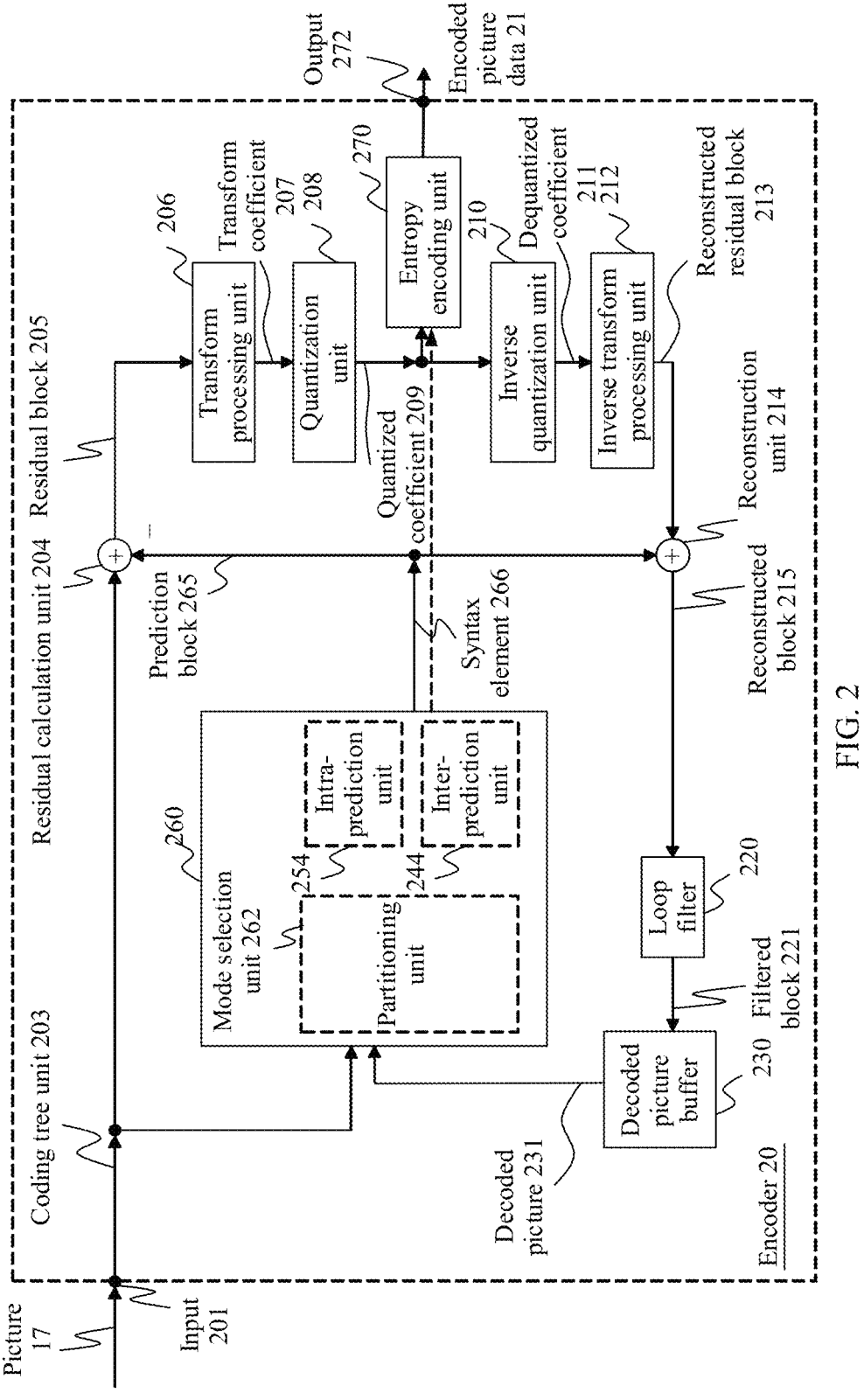
FIG. 2 is a block diagram showing an example of a video encoder configured to implement embodiments of the present application, where the video encoder 20 encodes a video picture based on deep learning.
Figure 3:
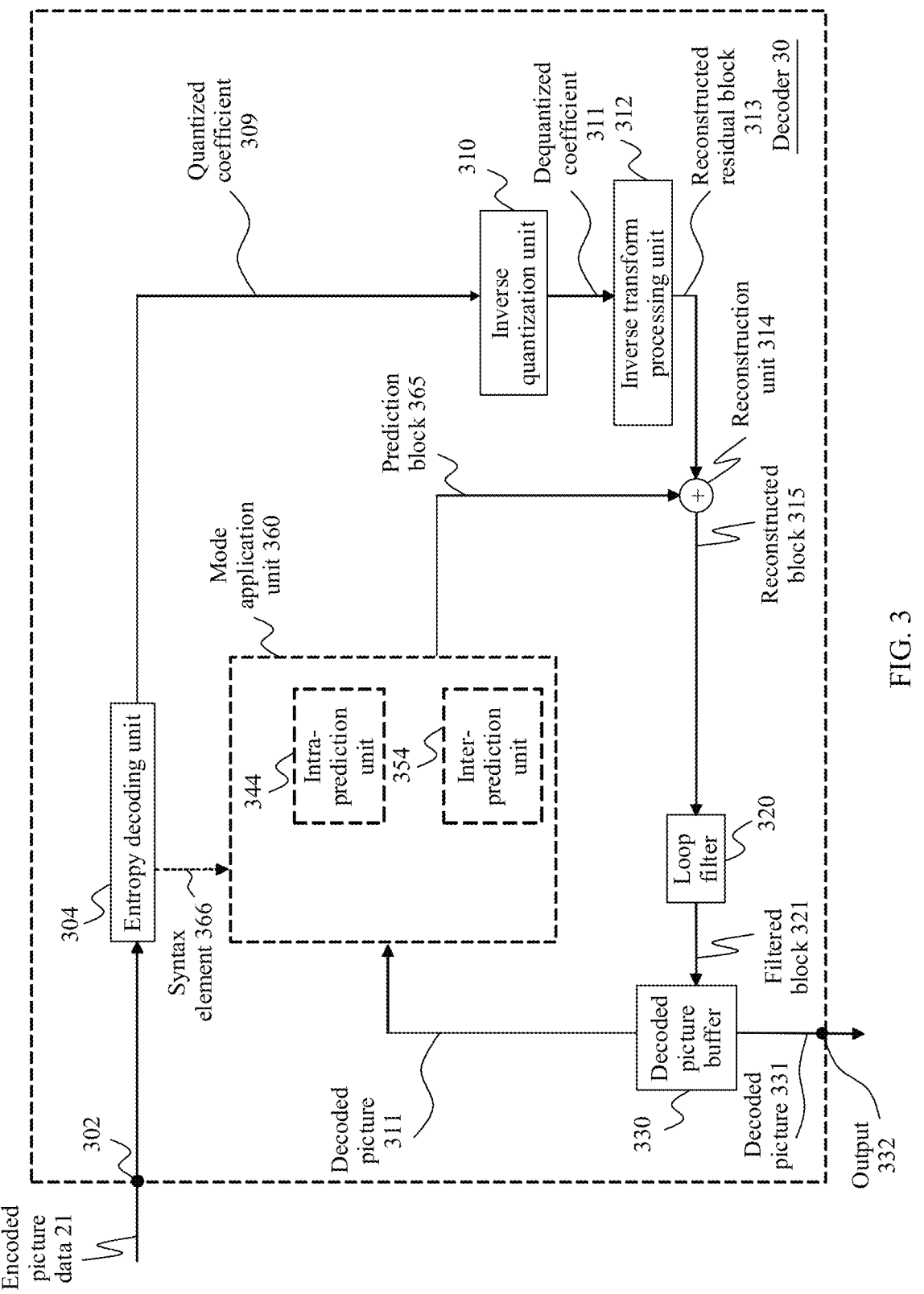
FIG. 3 is a block diagram showing an example of a video decoder configured to implement embodiments of the present application, where the video decoder 30 decodes a video picture based on deep learning.

FIG. 1C is an illustrative diagram showing an example of a video coding system 40, including the video encoder 20 in FIG. 2 and/or the video decoder 30 in FIG. 3, according to an example embodiment. The video coding system 40 may include an imaging device 41, the video encoder 20, the video decoder 30 (and/or a video encoder/decoder implemented by the processing circuit 46), an antenna 42, one or more processors 43, one or more memories 44, and/or a display device 45.

As shown in FIG. 1C, the imaging device 41, the antenna 42, the processing circuit 46, the video encoder 20, the video decoder 30, the processor 43, the memory 44, and/or the display device 45 can communicate with each other. The video coding system 40 may include only the video encoder 20 or only the video decoder 30 in different examples.

In some examples, the antenna 42 may be configured to transmit or receive an encoded bitstream of video data. Further, in some examples, the display device 45 may be configured to present the video data. The processing circuit 46 may include application-specific integrated circuit (ASIC) logic, a graphics processing unit, a general-purpose processor, or the like. The video coding system 40 may also include the optional processor 43. The optional processor 43 may similarly include application-specific integrated circuit (ASIC) logic, a graphics processor, a general-purpose processor, or the like. In addition, the memory 44 may be a memory of any type, for example, a volatile memory (for example, a static random access memory (SRAM) or a dynamic random access memory (DRAM)) or a non-volatile memory (for example, a flash memory). In a non-limitative example, the memory 44 may be implemented by a cache memory. In other examples, the processing circuit 46 may include a memory (for example, a cache) for implementing an image buffer.

In some examples, the video encoder 20 implemented by using a logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may include the video encoder 20 as implemented via the processing circuit 46 to embody the various modules as discussed with respect to FIG. 2 and/or any other encoder system or subsystem described herein. The logic circuit may be configured to perform various operations described in this specification.

In some examples, the video decoder 30 may be implemented by the processing circuit 46 in a similar manner, to implement various modules that are described with reference to the video decoder 30 in FIG. 3 and/or any other decoder system or subsystem described in this specification. In some examples, the video decoder 30 implemented by using the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may include the video decoder 30 as implemented via the processing circuit 46 to embody the various modules as discussed with respect to FIG. 3 and/or any other decoder system or subsystem described herein.

In some examples, the antenna 42 may be configured to receive an encoded bitstream of video data. As described, the encoded bitstream may include data, an indicator, an index value, mode selection data, or the like related to video frame encoding described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

It should be understood that in this embodiment of this application, for the example described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy encode the syntax element into an encoded video bitstream. In such examples, the video decoder 30 may parse such syntax element and decode the related video data accordingly.

For convenience of description, embodiments of the present application are described herein, for example, with reference to reference software of versatile video coding (VVC) or high-efficiency video coding (HEVC) developed by the Joint Collaborative Team on Video Coding (JCT-VC) of the ITU-T Video Coding Experts Group (VCEG) and the ISO/IEC Moving Picture Experts Group (MPEG). A person of ordinary skill in the art may understand that embodiments of the present application are not limited to HEVC or VVC.
Encoder and Encoding Method FIG. 2 is a schematic block diagram showing an example of a video encoder 20 configured to implement the techniques of this application. In the example of FIG. 2, the video encoder 20 includes an input (or an input interface) 201, a residual calculation unit 204, a transform processing unit 206, a quantization unit 208, an inverse quantization unit 210, and inverse transform processing unit 212, a reconstruction unit 214, a loop filter 220, a decoded picture buffer (DPB) 230, a mode selection unit 260, an entropy encoding unit 270 and an output (or an output interface) 272. The mode selection unit 260 may include an inter-prediction unit 244, an intra-prediction unit 254 and a partitioning unit 262. The inter-prediction unit 244 may include a motion estimation unit and a motion compensation unit (not shown). The video encoder 20 shown in FIG. 2 may also be referred to as a hybrid video encoder or a video encoder based on a hybrid video codec.

The residual calculation unit 204, the transform processing unit 206, the quantization unit 208, and the mode selection unit 260 form a forward signal path of the encoder 20. The inverse quantization unit 210, the inverse transform processing unit 212, the reconstruction unit 214, the buffer 216, the loop filter 220, the decoded picture buffer (DPB) 230, the inter-prediction unit 244, and the intra-prediction unit 254 form a backward signal path of the encoder. The backward signal path of the encoder 20 corresponds to the signal path of the decoder (see the decoder 30 in FIG. 3). The inverse quantization unit 210, the inverse transform processing unit 212, the reconstruction unit 214, the loop filter 220, the decoded picture buffer 230, the inter-prediction unit 244, and the intra-prediction unit 254 form a "built-in decoder" of the video encoder 20.
Quantitation The quantization unit 208 may be configured to quantize transform coefficients 207 to obtain quantized transform coefficients 209, for example, through scalar quantization or vector quantization. The quantized transform coefficient 209 may also be referred to as a quantized residual coefficient 209.

A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to finer quantization (a smaller quantization step) and a larger quantization parameter may correspond to coarser quantization (a larger quantization step), or vice versa. The quantization may include division by a quantization step and corresponding or inverse dequantization, for example, performed by the inverse quantization unit 210, or may include multiplication by a quantization step. Embodiments according to some standards such as HEVC may use a quantization parameter to determine the quantization step. Generally, the quantization step may be calculated based on a quantization parameter by using a fixed point approximation of an equation including division. Other scale factors may be introduced for quantization and dequantization to restore a norm of a residual block. The norm of the residual block may be modified because of a scale used in the fixed point approximation of the equation for the quantization step and the quantization parameter. In an example implementation, a scale of inverse transform may be combined with a scale of dequantization. Alternatively, customized quantization tables may be used and signaled from the encoder to the decoder, for example, in a bitstream. The quantization is a lossy operation, where a larger quantization step indicates a greater loss.

In an embodiment, the video encoder 20 (correspondingly, the quantization unit 208) may be configured to output quantization parameters (QPs), for example, directly, after encoding performed by the entropy encoding unit 270, or after compression, so that, for example, the video decoder 30 can receive and apply the quantization parameters for decoding.

Inverse Quantization

The inverse quantization unit 210 is configured to perform inverse quantization of the quantization unit 208 to a quantized coefficient to obtain a dequantized coefficient 211, for example, by applying the inverse of a quantization scheme performed by the quantization unit 208 based on or by using a same quantization step as that of the quantization unit 208. The dequantized coefficient 211 may also be referred to as a dequantized residual coefficient 211, and correspond to the transform coefficient 207, although the inverse quantized coefficient 211 is usually not completely the same as the transform coefficient due to a loss caused by quantization.

Reconstruction

The reconstruction unit 214 (for example, a summator 214) is configured to add the transform block 213 (that is, the reconstructed residual block 213) to the prediction block 265, for example, by adding pixel values of the reconstructed residual block 213 and the pixel values of the prediction block 265, to obtain a reconstructed block 215 in the pixel domain.

Filtering

The loop filter unit 220 (or the "loop filter" 220 for short) is configured to filter the reconstructed block 215 to obtain a filtered block 221, or usually to filter reconstructed pixels to obtain filtered pixel values. The loop filter unit is, for example, configured to smooth pixel transform or improve video quality. The loop filter unit 220 may include one or more loop filters such as a de-blocking filter, a sample-adaptive offset (SAO) filter or one or more other filters, for example, an adaptive loop filter (ALF), a noise suppression filter (NSF), or any combination thereof. In an example, the loop filter unit 220 may include a de-blocking filter, a SAO filter, and an ALF filter. An order of a filtering process may be the de-blocking filter, the SAO filter and the ALF filter. In another example, a process referred to as luma mapping with chroma scaling (LMCS) (namely, an adaptive in-loop reshaper) is added. This process is performed before de-blocking. In another example, a de-blocking filtering process may be also applied to an internal sub-block edge, for example, an affine sub-block edge, an ATMVP sub-block edge, a sub-block transform (SBT) edge, and an intra sub-partition (ISP) edge. Although the loop filter unit 220 is shown in FIG. 2 as a loop filter, in another configuration, the loop filter unit 220 may be implemented as a post-loop filter. The filtered block 221 may also be referred to as filtered reconstructed block 221.

In an embodiment, the video encoder 20 (correspondingly, the loop filter unit 220) may be configured to output loop filter parameters (such as SAO filter parameters, ALF filter parameters, or LMCS parameters), for example, directly or after entropy encoding performed by the entropy encoding unit 270, so that, for example, the decoder 30 can receive and apply same or different loop filter parameters for decoding.

Decoder and Decoding Method

FIG. 3 shows an example of a video decoder 30 configured to implement the techniques of this application. The video decoder 30 is configured to receive, for example, the encoded picture data 21 (for example, the encoded bitstream 21) encoded by the encoder 20, to obtain a decoded picture 331. The encoded picture data or the bitstream includes information for decoding the encoded picture data, for example, data that represents picture blocks of an encoded video slice (and/or tile groups or tiles) and related syntax elements.

In the example of FIG. 3, the decoder 30 includes an entropy decoding unit 304, an inverse quantization unit 310, an inverse transform processing unit 312, a reconstruction unit 314 (for example, a summator 314), a loop filter 320, a decoded picture buffer (DBP) 330, a mode application unit 360, an inter-prediction unit 344 and an intra-prediction unit 354. The inter-prediction unit 344 may be or include a motion compensation unit. The video decoder 30 may, in some examples, perform a decoding process that is substantially the inverse of the encoding process described with respect to the video encoder 20 in FIG. 2.

As explained with regard to the encoder 20, the inverse quantization unit 210, the inverse transform processing unit 212, the reconstruction unit 214, the loop filter 220, the decoded picture buffer (DPB) 230, the inter-prediction unit 344, and the intra-prediction unit 354 also form a "built-in decoder" of the video encoder 20. Accordingly, the inverse quantization unit 310 may be identical in function to the inverse quantization unit 110, the inverse transform processing unit 312 may be identical in function to the inverse transform processing unit 122, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video encoder 20 apply correspondingly to the respective units and functions of the video decoder 30.

Inverse Quantization

The inverse quantization unit 310 may be configured to: receive a quantization parameter (QP) (or in general information related to inverse quantization) and a quantized coefficient from the encoded picture data 21 (for example, by parsing and/or decoding, for example, by the entropy decoding unit 304), and perform, based on the quantization parameter, inverse quantization on the decoded quantized coefficient 309 to obtain an inverse quantized coefficient 311, which may also be referred to as a transform coefficient 311. An inverse quantization process may include: determining a degree of quantization based on a quantization parameter calculated by the video encoder 20 for each video block in the video slice, and similarly, determining a degree of inverse quantization that should be performed.

Reconstruction

The reconstruction unit 314 (for example, a summator 314) may be configured to add a reconstructed residual block 313 to a prediction block 365 to obtain a reconstructed block 315 in the pixel domain, for example, by adding pixel values of the reconstructed residual block 313 and pixel values of the prediction block 365.

Filtering

The loop filter unit 320 (either in or after a coding loop) is configured to filter the reconstructed block 315 to obtain a filtered block 321, for example, to smooth pixel transform or improve video quality. The loop filter unit 320 may include one or more loop filters such as a de-blocking filter, a sample-adaptive offset (SAO) filter or one or more other filters, for example, an adaptive loop filter (ALF), a noise suppression filter (NSF), or any combination thereof. In an example, the loop filter unit 320 may include a de-blocking filter, a SAO filter, and an ALF filter. An order of a filtering process may be the de-blocking filter, the SAO filter and the ALF filter. In another example, a process referred to as luma mapping with chroma scaling (LMCS) (namely, an adaptive in-loop reshaper) is added. This process is performed before de-blocking. In another example, a de-blocking filtering process may be also applied to an internal sub-block edge, for example, an affine sub-block edge, an ATMVP sub-block edge, a sub-block transform (SBT) edge, and an intra sub-partition (ISP) edge. Although the loop filter unit 320 is shown in FIG. 3 as a loop filter, in another configuration, the loop filter unit 320 may be implemented as a post-loop filter.

The decoder 30 is configured to output a decoded picture 331, for example, via an output 332, for presentation to a user or viewing by the user.

Although the foregoing embodiments have been mainly described based on video coding, it should be noted that embodiments of the coding system 10, the encoder 20 and the decoder 30 and the other embodiments described herein are also applicable to still picture processing or coding, that is, the processing or coding of an individual picture independent of any preceding or consecutive picture in video coding. Generally, if picture processing is limited to a single picture 17, the inter-prediction unit 244 (an encoder) and the inter-prediction unit 344 (a decoder) may be unavailable. All other functionalities (also referred to as tools or technologies) of the video encoder 20 and the video decoder 30 may equally be used for still picture processing, for example, residual calculation 204/304, transform 206, quantization 208, inverse quantization 210/310, (inverse) transform 212/312, partitioning 262/362, intra-prediction 254/354, and/or loop filtering 220/320, entropy encoding 270, and entropy decoding 304.

Figure 4:
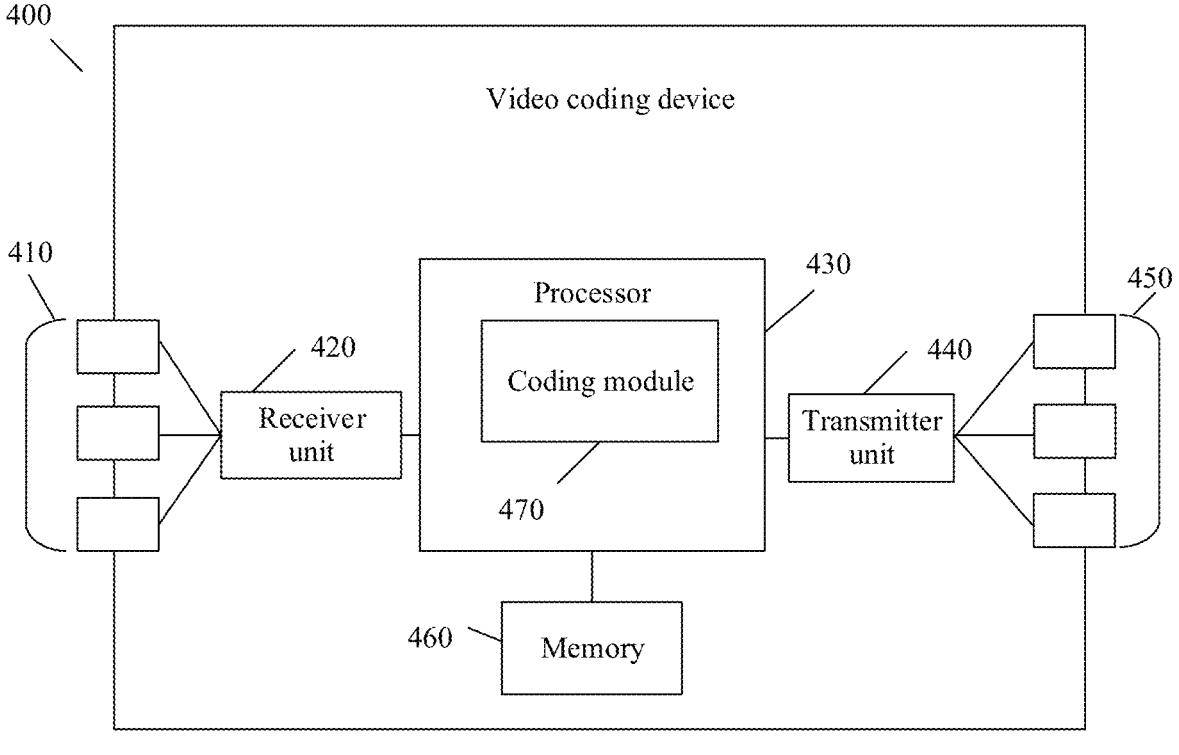
FIG. 4 is a schematic block diagram of a video coding apparatus configured to implement embodiments of the present application.

FIG. 4 is a schematic diagram of a video coding device 400 according to an embodiment of the present application. The video coding device 400 is applicable to implementing the disclosed embodiments described herein. In an embodiment, the video coding device 400 may be a decoder such as the video decoder 30 in FIG. 1B or an encoder such as the video encoder 20 in FIG. 1B.

The video coding device 400 includes: an ingress port 410 (or an input port 410) and a receiver unit (Rx) 420 for receiving data; a processor, a logic unit, or a central processing unit (CPU) 430 for processing the data, for example, the processor 430 may be a neural network processing unit 430; a transmitter unit (Tx) 440 and an egress port 450 (or an output port 450) for transmitting the data; and a memory 460 for storing the data. The video coding device 400 may also include an optical-to-electrical (OE) component and an electrical-to-optical (EO) component that are coupled to the ingress port 410, the receiver unit 420, the transmitter unit 440, and the egress port 450 and that are configured as an egress or an ingress of an optical or electrical signal.

The processor 430 is implemented by hardware and software. The processor 430 may be implemented as one or more CPU chips, cores (for example, a multi-core processor), FPGAs, ASICs, and DSPs. The processor 430 is in communication with the ingress port 410, the receiver unit 420, the transmitter unit 440, the egress port 450, and the memory 460. The processor 430 includes a coding module 470 (for example, a neural network (NN)-based coding module 470). The coding module 470 implements the disclosed embodiments described above. For example, the coding module 470 implements, processes, prepares, or provides various coding operations. Therefore, inclusion of the coding module 470 provides a substantial improvement to functions of the video coding device 400 and affects switching of the video coding device 400 to a different state. Alternatively, the coding module 470 is implemented based on instructions stored in the memory 460 and executed by the processor 430.

The memory 460 may include one or more disks, tape drives, and solid-state drives, and may be used as an overflowed data storage device, to store programs when such programs are selected for execution, and to store instructions and data that are read during program execution. The memory 460 may be volatile and/or non-volatile and may be a read-only memory (ROM), a random access memory (RAM), a ternary content-addressable memory (TCAM), and/or a static random-access memory (SRAM).

FIG. 5 is a simplified block diagram of an apparatus 500 according to an example embodiment. The apparatus 500 may be used as either or both of the source device 12 and the destination device 14 in FIG. 1B.

A processor 502 in the apparatus 500 may be a central processing unit. Alternatively, the processor 502 may be any other type of device, or a plurality of devices, capable of controlling or processing information now-existing or hereafter developed. Although the disclosed implementations can be implemented with a single processor as shown, for example, the processor 502, a faster speed and higher efficiency can be achieved by using more than one processor.

A memory 504 in the apparatus 500 may be a read-only memory (ROM) device or a random access memory (RAM) device in an implementation. Any other suitable type of storage device can be used as the memory 504. The memory 504 may include code and data 506 that can be accessed by the processor 502 through a bus 512. The memory 504 may further include an operating system 508 and an application program 510. The application program 510 including at least one program that permits the processor 502 to perform the methods described herein. For example, the application program 510 may include applications 1 to N, and may further include a video coding application that performs the methods described herein.

The apparatus 500 may further include one or more output devices, such as a display 518. The display 518 may be, in one example, a touch-sensitive display combining a display with a touch-sensitive element configured to sense a touch input. The display 518 may be coupled to the processor 502 through the bus 512.

Although depicted herein as a single bus, the bus 512 of the apparatus 500 may include a plurality of buses. Further, an auxiliary storage may be directly coupled to another component of the apparatus 500, or may be accessed over a network, and may include a single integrated unit such as a memory card or a plurality of units such as a plurality of memory cards. The apparatus 500 may thus be implemented in a wide variety of configurations.

Embodiments of the present application relate to a lossy AI picture coding scheme for color component bit rate allocation, and are applicable to the video coding system, the encoder, and the decoder described in FIG. 1A to FIG. 5.

It should be noted that the method provided in this application is mainly applied to a bit rate allocation process for Y, U, and V components. This process is mainly controlled by an encoder side. To make the decoder side more adaptive, a corresponding control unit may also be added to the decoder.

A video picture signal usually includes one luma component and two chroma components. The luma component is usually represented by a symbol Y, and the chroma component is usually represented by a symbol U or V. As shown in (a) to (c) in FIG. 6, a commonly used YUV format includes the following formats. In FIG. 7, a cross represents a sampling point of the luma component, and a circle represents a sampling point of each chroma component.

4:4:4 format: A chroma component is not downsampled.

4:2:2 format: For a chroma component relative to a luma component, 2:1 horizontal downsampling is performed, and no vertical downsampling is performed. For every two U sampling points or V sampling points, each row scanned includes four Y sampling points.

4:2:0 format: For a chroma component relative to a luma component, 2:1 horizontal downsampling is performed, and 2:1 vertical downsampling is performed.

When a video picture is in a YUV 4:2:0 format, if a luma component of a picture block is a 2N×2N picture block, a chroma component of the picture block is an N×N picture block. In this embodiment of the present application, the technical solutions of the present application are described by using an example of the 4:2:0 format. However, it may be understood that, in addition to the YUV 4:2:0 format, the technical solutions of the present application are also applicable to mutual prediction between different components in another YUV format or another video picture format, for example, an RGB format. On the other hand, a current block may be a square block, or may be a non-square rectangular block or another shape area, and the technical solutions provided in embodiments of the present application are also applicable.

For ease of description, this embodiment of the present application is described by using a first signal component and a second signal component. If a picture signal includes a luma signal component and a chroma signal component, the first signal component may be the chroma component, and the second signal component may be the luma component. If the picture signal includes three signal components R, G, and B, the first signal component may be any one of the three signal components R, G, and B, and the second signal component may be one of the three signal components R, G, and B that is different from the first signal component. If the picture signal is otherwise decomposed into a plurality of signal components, a similar method may be used to specify the first signal component and the second signal component.

As described below, in this embodiment of this application, a quality factor may be input into a bit rate control module (or referred to as a bit rate allocation control module). The module generates a control signal of a feature map of each component. A control vector of the control signal of each component is multiplied by a corresponding feature map, to obtain a quantized feature value, that is, a to-be-encoded feature value.

Figure 7A:
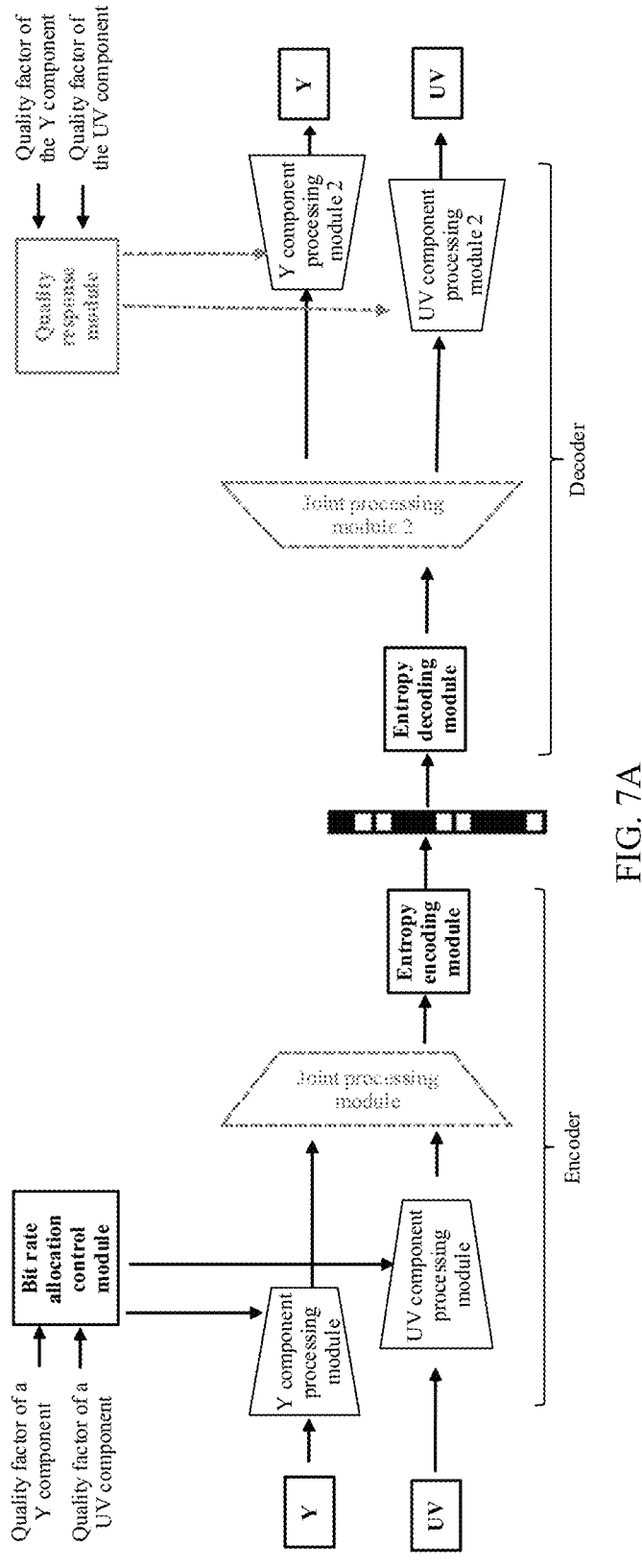
FIG. 7A is a schematic diagram of a scalable encoding and decoding structure according to an embodiment of this application.

FIG. 7A shows an AI picture coding system 700 for YUV bit rate allocation according to an embodiment of the present application. The AI picture coding system 700 is applicable to a video picture encoder and decoder. As shown in FIG. 7A, the picture coding system 700 includes a first signal component processing module (for example, a Y component processing module), a second signal component processing module (for example, a UV component processing module), a bit rate allocation control module, and an entropy encoding module at an encoder side, and a first signal component processing module (a Y component processing module 2), a second signal component processing module (for example, a UV component processing module 2), and an entropy decoding module at a decoder side. The picture coding system 700 optionally includes a joint processing module, a joint processing module 2, and a quality response module (also referred to as a bit rate allocation control module 2 or a bit rate control module 2). In the picture coding system 700, a quality factor of a Y component and a quality factor of a UV component are input into the bit rate allocation control module. The module outputs control signals that are respectively applied to a feature map of the Y component output by the Y component processing module and a feature map of the UV component output by the UV component processing module (which may be separately referred to as a first feature map), and outputs a second feature map of each signal component, to allocate bit rates of the Y and UV components. Then, a bitstream of a video signal is obtained based on the second feature maps of the signal components. For example, feature maps output by the Y component processing module and the UV component processing module are directly concatenated together, or feature maps output by the Y component processing module and the UV component processing module are directly added together to form a feature map finally output by the encoder, and entropy encoding is performed on the finally output feature map. Optionally, feature maps output by the Y component processing module and the UV component processing module are input into the joint processing module, to obtain a feature map finally output by the encoder, and entropy encoding is performed on the finally output feature map.

In an architecture shown in FIG. 7A, FIG. 7B is an embodiment of an encoding method. Operation 701: Obtain a control signal of a first signal component based on a quality factor of the first signal component. Operation 702: Obtain a control signal of a second signal component based on a quality factor of the second signal component. For example, in the embodiment shown in FIG. 7B, the control signal of the first signal component can be obtained from N candidate first control signals based on the quality factor of the first signal component, where N is an integer greater than 1. The control signal of the second signal component can be obtained from M candidate second control signals based on the quality factor of the second signal component, where M is an integer greater than 1. N and M may be equal or unequal. This is not limited in this application.

Operation 703: Apply the control signal of the first signal component to a first feature map of the first signal component, to obtain a second feature map of the first signal component. Operation 704: Apply the control signal of the second signal component to a first feature map of the second signal component, to obtain a second feature map of the second signal component.

For example, in an embodiment, the control signal is generated through learning by a network, and is applied to a feature map (which may be referred to as the first feature map) output by at least one layer of the network in each of the Y component processing module and the UV component processing module, to output the second feature map. For example, the control signal is applied to a feature map output by a last layer of the network.

Operation 705: Obtain a bitstream of a video signal based on the second feature map of the first signal component and the second feature map of the second signal component.

Because the control signal may be applied to a first feature map output by any layer of the network in each of the Y component processing module and the UV component processing module, after the second feature map is output, processing by a neural network may continue to be performed on the second feature map. Correspondingly, obtaining the bitstream of the video signal based on the second feature map of the Y component and the second feature map of the UV component includes:

performing entropy encoding on the second feature map of the first signal component and the second feature map of the second signal component, to obtain the bitstream of the video signal;

performing entropy encoding on the second feature map of the first signal component and the second feature map of the second signal component that is processed by a neural network, to obtain the bitstream of the video signal;

performing entropy encoding on the second feature map of the first signal component that is processed by a neural network and the second feature map of the second signal component, to obtain the bitstream of the video signal; or performing entropy encoding on the second feature map of the first signal component that is processed by a neural network and the second feature map of the second signal component that is processed by a neural network, to obtain the bitstream of the video signal.

When the picture coding system 700 includes the joint processing module, obtaining the bitstream of the video signal based on the second feature map of the first signal component and the second feature map of the second signal component includes:

performing joint processing on the second feature map of the first signal component and the second feature map of the second signal component, to obtain a joint feature map, and performing entropy encoding on the joint feature map to obtain the bitstream of the video signal;

performing joint processing on the second feature map of the first signal component and the second feature map of the second signal component that is processed by a neural network, to obtain a joint feature map, and performing entropy encoding on the joint feature map to obtain the bitstream of the video signal;

performing joint processing on the second feature map of the first signal component that is processed by a neural network and the second feature map of the second signal component, to obtain a joint feature map, and performing entropy encoding on the joint feature map to obtain the bitstream of the video signal; or performing joint processing on the second feature map of the first signal component that is processed by a neural network and the second feature map of the second signal component that is processed by a neural network, to obtain a joint feature map, and performing entropy encoding on the joint feature map to obtain the bitstream of the video signal.

Details are as follows:

When the control signal includes control vectors of Y and UV feature maps, the bit rate allocation control module generates, through learning, N candidate first control signals (for example, a control vector matrix $\{q_{y1}, q_{y2}, \ldots q_{yi} \ldots q_{yN}\}$) of the first signal component and M candidate second control signals (for example, a control vector matrix $\{q_{uv1}, q_{uv2}, \ldots q_{uvj}, \ldots q_{uvM}\}$) of the second signal component. During use, a control signal $q_{yi}$ of the first signal component is obtained based on an index i of the quality factor of the Y component, and a control signal $q_{uvj}$ of the second signal component is obtained based on an index j of the quality factor of the UV component. N and M are integers greater than 1. Then, each control vector is multiplied by a corresponding feature map channel by channel, to control feature maps of different components. In this case, the bitstream of the video signal sent to the decoder side includes the index i of the quality factor of the Y component and the index j of the quality factor of the UV component.

When the control signal includes control vectors and offset vectors of Y and UV feature maps, as described in the foregoing method, a control vector $q_{yi}$ and an offset vector $b_{yi}$ of the first signal component are obtained based on an index i of the quality factor of the Y component; and a control vector $q_{uvj}$ and an offset vector $b_{uvi}$ of the second signal component are obtained based on an index j of the quality factor of the UV component. Then, each control vector is multiplied by a corresponding feature map channel by channel and a corresponding offset vector is added to control feature maps of different components.

In another embodiment, a control signal of the Y component and a control signal of the UV component are used as a 2-tuple. The bit rate allocation control module generates, through learning, N candidate control signal (for example, a control vector matrix $\{q_{c1}, q_{c2}, \ldots q_{ci} \ldots q_{cN}\}$) of the video signal. In this case, c is 2, and each control vector $q_{ci}$ includes both a control vector of the first signal component and a control vector of the second signal component. Then, a control signal $q_{ci}$ that includes the first signal component and the second signal component is obtained based on an index i of a quality factor of the video signal. The offset vector is implemented in a similar manner. To be specific, each offset vector of the video signal includes both an offset vector of the first signal component and an offset vector of the second signal component. In this case, the bitstream of the video signal sent to the decoder side includes the index i of the quality factor of the video signal.

In still another embodiment, the quality factor of the Y component and the quality factor of the UV component are used as inputs into a fully-connected network, and a control vector $q_{yi}$ and a control vector $q_{uvj}$ are output. Each control vector is multiplied by a corresponding feature map channel by channel, to control feature maps of different components. The quality factor of the Y component and the quality factor of the UV component are used as inputs into the fully-connected network, and an offset vector $b_{yi}$ and an offset vector $b_{uvj}$ may be further output. Then, each control vector is multiplied by a corresponding feature map channel by channel, and each offset vector is added to a corresponding feature map channel by channel, to control feature maps of different components. In this case, the bitstream of the video signal sent to the decoder side includes the quality factor of the Y component and the quality factor of the UV component.

The decoder side performs entropy decoding on the received bitstream to obtain a feature map, and the feature map is decomposed into a feature map of the Y component and a feature map of the UV component. Optionally, the feature map obtained through entropy decoding is first input into the joint processing submodule 2, to obtain the feature map of the Y component and the feature map of the UV component.

The feature map of the Y component and the feature map of the UV component are respectively input into the Y component processing module 2 and the UV component processing module 2 to output a reconstructed map of the Y component and a reconstructed map of the UV component. Optionally, the quality factor of the Y component and the quality factor of the UV component are input into the quality response module. The module outputs response signals that are respectively applied to the feature map of the Y component output by the Y component processing module and the feature map of the UV component output by the UV component processing module, to implement adaptive quality responses of the Y component and the UV component. The quality response may also be referred to as quality control, and is merely referred to as a quality response at the decoder side for distinguishing from quality control at the encoder side.

Specifically, as shown in FIG. 7C as an example, operation 711: The decoder side obtains a bitstream of a video signal from the encoder side, and performs entropy decoding on the bitstream to obtain a feature map of a first signal component (for example, a Y component) of the video signal and a feature map of a second signal component (for example, a UV component) of the video signal.

The decoder side further obtains, from the bitstream, quality factor information of the first signal component and quality factor information of the second signal component. The quality factor information of the first signal component is a quality factor of the first signal component or an index of the quality factor of the first signal component. The quality factor information of the second signal component is a quality factor of the second signal component or an index of the quality factor of the second signal component. Then, a response signal of the first signal component is obtained based on the quality factor information of the first signal component, and a response signal of the second signal component is obtained based on the quality factor information of the second signal component. When the quality factor information of the first signal component is the quality factor of the first signal component, a value of the quality factor of the first signal component is one of N. Alternatively, when the quality factor information of the first signal component is the index of the quality factor of the first signal component, a value range of the index of the quality factor of the first signal component is 0 to N-1 or 1 to N, where N is an integer greater than 1. Similarly, when the quality factor information of the second signal component is the quality factor of the second signal component, a value of the quality factor of the second signal component is one of M. Alternatively, when the quality factor information of the second signal component is the index of the quality factor of the second signal component, a value range of the index of the quality factor of the second signal component is 0 to M-1 or 1 to M, where M is an integer greater than 1.

When a joint feature map is transferred from the encoder side, the decoder side further needs to perform entropy decoding on the joint feature map, and obtain, through processing by a neural network, the feature map of the first signal component and the feature map of the second signal component.

Operation 712: Obtain a response signal of the first signal component based on the quality factor information of the first signal component. Operation 713: Obtain a response signal of the second signal component based on the quality factor information of the second signal component.

In an embodiment, if the bitstream includes an index i of a quality factor of the Y component and an index j of a quality factor of the UV component, the decoder side needs to generate, through learning, a response signal matrix $\{g_{y1}, g_{y2}, \ldots g_{yi} \ldots g_{cN}\}$ of the first signal component and a response signal matrix $\{g_{uv1}, g_{uv2}, \ldots g_{uvj}, \ldots g_{uvM}\}$ of the second signal component, where N and M are integers greater than 1. Optionally, a response signal matrix $\{g_{y1}, g_{y2}, \ldots g_{yi} \ldots g_{yN}\}$ of the first signal component is obtained by taking a reciprocal of a control signal matrix $\{q_{y1}, q_{y2}, \ldots q_{yi} \ldots q_{yN}\}$ of the first signal component at the encoder side, and a response signal matrix $\{g_{uv1}, g_{uv2}, \ldots g_{uvj}, \ldots g_{uvM}\}$ of the second signal component is obtained by taking a reciprocal of a control signal matrix $\{q_{uv1},$ $q_{uv2}, \ldots q_{uvi} \ldots q_{uvN}\}$ of the second signal component at the encoder side, where N and M are integers greater than 1. A response signal $g_{yi}$ of the first signal component is obtained based on the index i of the quality factor of the Y component. A response signal $g_{uvj}$ of the second signal component is obtained based on the index j of the quality factor of the UV component.

In another embodiment, if the bitstream includes an index i of a quality factor of the video signal, the decoder side needs to generate, through learning, a response signal matrix $\{g_{c1}, g_{c2}, \ldots g_{ci} \ldots g_{cN}\}$ of the video signal, where c is 2 and represents the Y component and the UV component, and N is an integer greater than 1. Optionally, a response signal matrix $\{g_{c1}, g_{c2}, g_{ic} \ldots g_{cN}\}$ of the video signal is obtained by taking a reciprocal of a control signal matrix $\{q_{c1}, q_{c2}, \ldots q_{ci} \ldots g_{cN}\}$ of the video signal at the encoder side, where c is 2 and represents the Y component and the UV component, and N is an integer greater than 1. A response signal $g_{ci}$ that includes the first signal component and the second signal component is obtained based on the index i of the quality factor of the video signal.

In still another embodiment, if the bitstream includes the quality factor of the first signal component and the quality factor of the second signal component, the decoder side uses the quality factor of the Y component as an input into the fully-connected network, and outputs a response signal of the Y component; and uses the quality factor of the UV component as an input into the fully-connected network, and outputs a response signal of the UV component.

Operation 714: Obtain a reconstructed map of the first signal component based on the response signal of the first signal component and the feature map of the first signal component. Operation 715: Obtain a reconstructed map of the second signal component based on the response signal of the second signal component and the feature map of the second signal component.

When the response signal includes a response vector, obtaining the reconstructed map of the first signal component based on the response signal of the first signal component and the feature map of the first signal component includes:

multiplying a response vector of the first signal component by the feature map of the first signal component, to obtain the reconstructed map of the first signal component, or multiplying the response vector of the first signal component by the feature map of the first signal component, and then obtaining, through processing by a neural network, the reconstructed map of the first signal component.

Obtaining the reconstructed map of the second signal component based on the response signal of the second signal component and the feature map of the second signal component includes:

multiplying a response vector of the second signal component by the feature map of the second signal component, to obtain the reconstructed map of the second signal component, or multiplying the response vector of the second signal component by the feature map of the second signal component, and then obtaining, through processing by a neural network, the reconstructed map of the second signal component.

When the response signal includes a response vector and an offset vector, obtaining the reconstructed map of the first signal component based on the response signal of the first signal component and the feature map of the first signal component includes:

multiplying a response vector of the first signal component by the feature map of the first signal component, and then adding an offset vector of the first signal component, to obtain the reconstructed map of the first signal component, or multiplying the response vector of the first signal component by the feature map of the first signal component, adding the offset vector of the first signal component, and then obtaining, through processing by a neural network, the reconstructed map of the first signal component.

Obtaining the reconstructed map of the second signal component based on the response signal of the second signal component and the feature map of the second signal component includes:

multiplying a response vector of the second signal component by the feature map of the second signal component, and then adding an offset vector of the second signal component, to obtain the reconstructed map of the second signal component, or multiplying the response vector of the second signal component by the feature map of the second signal component, adding the offset vector of the second signal component, and then obtaining, through processing by a neural network, the reconstructed map of the second signal component.

Operation 716: Reconstruct the video signal based on the reconstructed map of the first signal component and the reconstructed map of the second signal component.

Figure 7D:
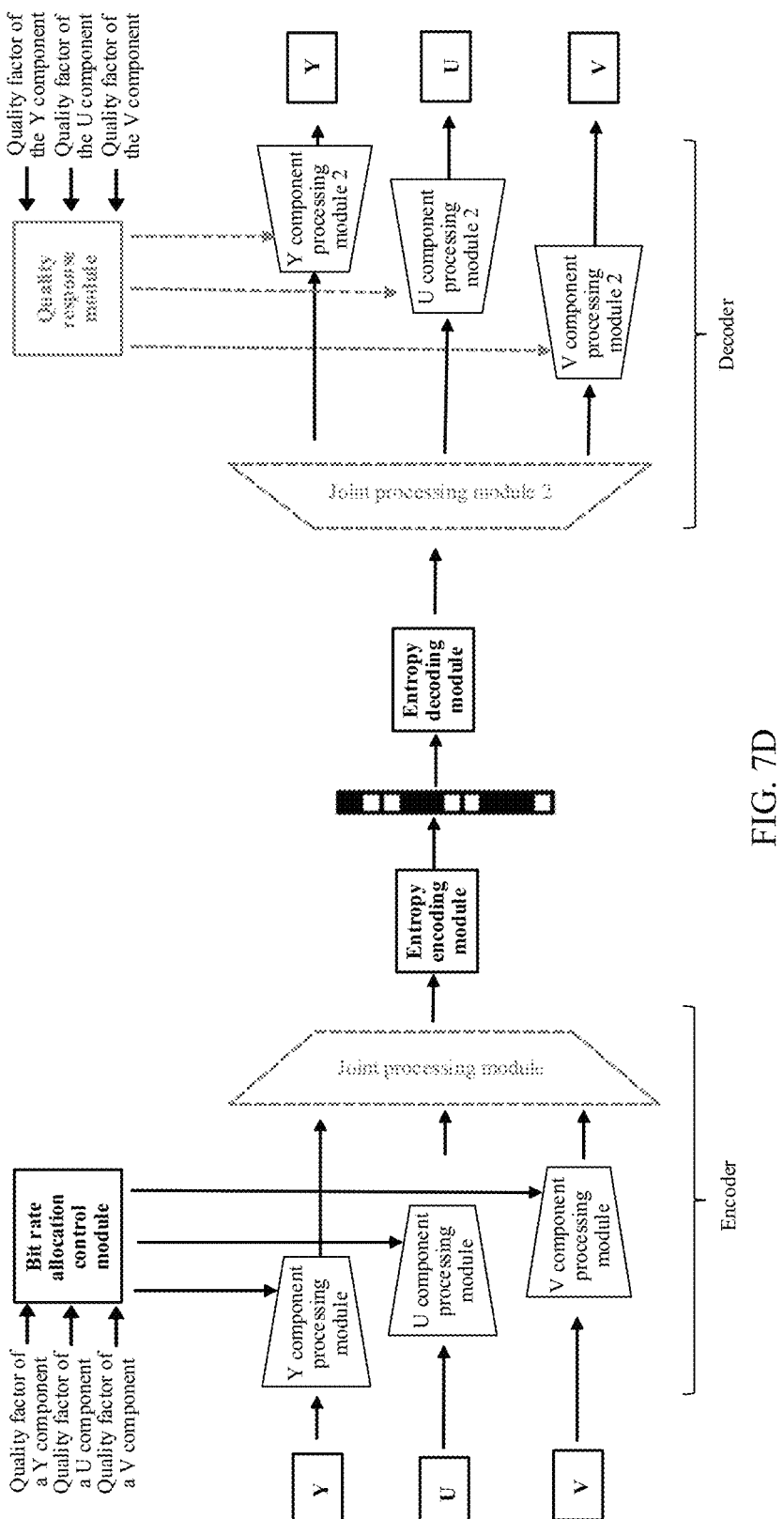
FIG. 7D is another schematic diagram of a scalable encoding and decoding structure according to an embodiment of this application.

FIG. 7D shows an AI picture coding system 710 for YUV bit rate allocation according to an embodiment of the present application. The AI picture coding system 710 is applicable to a video picture encoder and decoder. As shown in FIG. 7D, the picture coding system 710 includes a first signal component processing module (for example, a Y component processing module), a second signal component processing module (for example, a U component processing module), a third signal component processing module (for example, a V component processing module), a bit rate allocation control module, and an entropy encoding module at an encoder side, and a first signal component processing module (a Y component processing module 2), a second signal component processing module (for example, a U component processing module 2), a third signal component processing module (for example, a V component processing module 2), and an entropy decoding module at a decoder side. The picture coding system 710 optionally includes a joint processing module, a joint processing module 2, and a quality response module (also referred to as a bit rate allocation control module 2 or a bit rate control module 2). In the picture coding system 710, a quality factor of a Y component, a quality factor of a U component, and a quality factor of a V component are input into a bit rate allocation control module. The module outputs control signals that are respectively applied to a feature map of the Y component output by the Y component processing module, a feature map of the U component output by the U component processing module, and a feature map of the V component output by the V component processing module (which may be separately referred to as a first feature map), and outputs a second feature map of each signal component, to allocate bit rates of the Y, U and V components. Then, a bitstream of a video signal is obtained based on the second feature maps of the signal components. For example, feature maps output by the Y component processing module, the U component processing module, and the V component processing module are directly concatenated together, or feature maps output by the Y component processing module, the U component processing module, and the V component processing module are directly added together to form a feature map finally output by the encoder, and entropy encoding is performed on the finally output feature map. Optionally, feature maps output by the Y component processing module, the U component processing module, and the V component processing module are input into the joint processing module, to obtain a feature map finally output by the encoder, and entropy encoding is performed on the finally output feature map.

In the embodiment shown in FIG. 7D, the control signal of the first signal component can be obtained from N candidate first control signals based on the quality factor of the first signal component (the Y component). The control signal of the second signal component can be obtained from M candidate second control signals based on the quality factor of the second signal component (the U component). The control signal of the third signal component can be obtained from L candidate third control signals based on the quality factor of the third signal component (the V component). N, M, and L are integers greater than 1, and may be equal or unequal. This is not limited in this application.

In an architecture shown in FIG. 7D, the encoding and decoding method is similar to those in FIG. 7B and FIG. 7C. Details are as follows:

For example, in an embodiment, the control signal is generated through learning by a network, and is applied to a feature map (which may be referred to as a first feature map) output by at least one layer of the network in each of the Y component processing module, the U component processing module, and the V component processing module, to output a second feature map. For example, the control signal is applied to a feature map output by a last layer of the network. Because the control signal may be applied to a first feature map output by any layer of the network in each of the Y component processing module, the U component processing module, and the V component processing module, after the second feature map is output, processing by a neural network may continue to be performed on the second feature map. Correspondingly, obtaining the bitstream of the video signal based on the second feature map of the Y component, the second feature map of the U component, and the second feature map of the V component includes:

performing entropy encoding on the second feature map of the first signal component, the second feature map of the second signal component, and the second feature map of the third signal component, to obtain the bitstream of the video signal;

performing entropy encoding on the second feature map of the first signal component, the second feature map of the second signal component that is processed by a neural network, and the second feature map of the third signal component, to obtain the bitstream of the video signal;

performing entropy encoding on the second feature map of the first signal component, the second feature map of the second signal component that is processed by a neural network, and the second feature map of the third signal component that is processed by a neural network, to obtain the bitstream of the video signal;

performing entropy encoding on the second feature map of the first signal component, the second feature map of the second signal component, and the second feature map of the third signal component that is processed by a neural network, to obtain the bitstream of the video signal;

performing entropy encoding on the second feature map of the first signal component that is processed by a neural network, the second feature map of the second signal component, and the second feature map of the third signal component, to obtain the bitstream of the video signal;

performing entropy encoding on the second feature map of the first signal component that is processed by a neural network, the second feature map of the second signal component that is processed by a neural network, and the second feature map of the third signal component, to obtain the bitstream of the video signal;

performing entropy encoding on the second feature map of the first signal component that is processed by a neural network, the second feature map of the second signal component that is processed by a neural network, and the second feature map of the third signal component that is processed by a neural network, to obtain the bitstream of the video signal; or performing entropy encoding on the second feature map of the first signal component that is processed by a neural network, the second feature map of the second signal component, and the second feature map of the third signal component that is processed by a neural network, to obtain the bitstream of the video signal.

When the picture coding system 710 includes the joint processing module, joint processing may further be performed on the obtained second feature maps, or the processed feature map and combination, to obtain a joint feature map, and entropy encoding is performed on the joint feature map to obtain the bitstream of the video signal.

Details are as follows:

When the control signal includes control vectors of Y, U, and V feature maps, the bit rate allocation control module generates, through learning, N candidate first control signals (for example, a control vector matrix $\{q_{y1}, q_{y2}, \ldots q_{yi} \ldots q_{yN}\}$) of the first signal component, M candidate second control signals (for example, a control vector matrix $\{q_{u1}, q_{u2}, \ldots q_{uj} \ldots, q_{uM}\}$) of the second signal component, and L candidate third control signals (for example, a control vector matrix $\{q_{v1}, q_{v2}, \ldots, q_{vk} \ldots q_{vL}\}$) of the third signal component. A control signal $q_{yi}$ of the first signal component is obtained based on an index i of the quality factor of the Y component during use. A control signal $q_{uj}$ of the second signal component is obtained based on an index j of the quality factor of the U component. A control signal $q_{vk}$ of the third signal component is obtained based on an index k of the quality factor of the V component. Then, each control vector is multiplied by a corresponding feature map channel by channel, to control feature maps of different components. In this case, the bitstream of the video signal sent to the decoder side includes the index i of the quality factor of the Y component, the index j of the quality factor of the U component, and the index k of the quality factor of the V component.

When the control signal includes control vectors and offset vectors of Y, U, and V feature maps, as described in the foregoing method, a control vector $q_{yi}$ and an offset vector $b_{yi}$ of the first signal component are obtained based on the index i of the quality factor of the Y component during use; a control vector $q_{uj}$ and an offset vector $b_{uj}$ of the second signal component are obtained based on the index j of the quality factor of the U component; and a control vector $q_{vk}$ and an offset vector $b_{vi}$ of the third signal component are obtained based on the index k of the quality factor of the V component. Then, each control vector is multiplied by a corresponding feature map channel by channel and a corresponding offset vector is added to control feature maps of different components.

In another embodiment, a control signal of the Y component, a control signal of the U component, and a control signal of the V component are used as a 3-tuple. The bit rate allocation control module generates, through learning, N candidate control signal (for example, a control vector matrix $\{q_{c1}, q_{c2}, \ldots q_{ci} \ldots q_{cN}\}$) of the video signal. In this case, c is 3, and each control vector qc, includes a control vector of the first signal component, a control vector of the second signal component, and a control vector of the third signal component. Then, a control signal $q_{ci}$ that includes the first signal component, the second signal component, and the third signal component is obtained based on an index i of a quality factor of the video signal. The offset vector is implemented in a similar manner. To be specific, each offset vector of the video signal includes an offset vector of the first signal component, an offset vector of the second signal component, and an offset vector of the third signal component. In this case, the bitstream of the video signal sent to the decoder side includes the index i of the quality factor of the video signal.

In still another embodiment, the quality factor of the Y component, the quality factor of the U component, and the quality factor of the V component are used as inputs into a fully-connected network, and a control vector $q_{yi}$, a control vector $q_{ui}$ and a control vector $q_{vK}$ are output. Each control vector is multiplied by a corresponding feature map channel by channel, to control feature maps of different components. The quality factor of the Y component, the quality factor of the U component, and the quality factor of the V component are used as inputs into the fully-connected network, and an offset vector $b_{yi}$, an offset vector $b_{uj}$, and an offset vector $b_{vK}$ may be further output. Then, each control vector is multiplied by a corresponding feature map channel by channel, and each offset vector is added to a corresponding feature map channel by channel, to control feature maps of different components. In this case, the bitstream of the video signal sent to the decoder side includes the quality factor of the Y component, the quality factor of the U component, and the quality factor of the V component.

The decoder side performs entropy decoding on the received bitstream to obtain a feature map, and the feature map is decomposed into a feature map of the Y component, a feature map of the U component, and a feature map of the V component. Optionally, the feature map obtained through entropy decoding is first input into the joint processing submodule 2, to obtain the feature map of the Y component, the feature map of the U component, and the feature map of the V component.

The feature map of the Y component, the feature map of the U component, and the feature map of the V component are respectively input into the Y component processing module 2, the U component processing module 2, and the V component processing module 2 to output a reconstructed map of the Y component, a reconstructed map of the U component, and a reconstructed map of the V component. Optionally, the quality factor of the Y component, the quality factor of the U component, and the quality factor of the V component are input into the quality response module. The module outputs control signals that are respectively applied to the feature map of the Y component output by the Y component processing module, the feature map of the U component output by the U component processing module, and the feature map of the V component output by the V component processing module, to implement adaptive quality responses of the Y, U, and V components.

The response signals are generated in a manner similar to that of the control signals. For ease of distinguishing, the signal at the encoder side is referred to as a control signal, and the signal at the decoder side is referred to as a response signal.

Specifically, the decoder side obtains the bitstream of the video signal from the encoder side; performs entropy decoding on the bitstream to obtain a feature map of the first signal component (for example, the Y component) of the video signal, a feature map of the second signal component (for example, the U component) of the video signal, and a feature map of the third signal component (for example, the V component) of the video signal; obtains a reconstructed map of the first signal component based on a response signal of the first signal component and the feature map of the first signal component, where the response signal of the first signal component is obtained through learning; obtains a reconstructed map of the second signal component based on a response signal of the second signal component and the feature map of the second signal component, where the response signal of the second signal component is obtained through learning; obtains a reconstructed map of the third signal component based on a response signal of the third signal component and the feature map of the third signal component, where the response signal of the third signal component is obtained through learning; and reconstructs the video signal based on the reconstructed map of the first signal component, the reconstructed map of the second signal component, and the reconstructed map of the third signal component.

The decoder side further obtains, from the bitstream, quality factor information of the first signal component, quality factor information of the second signal component, and quality factor information of the third signal component. The quality factor information of the first signal component and the quality factor information of the second signal component are similar to those in the embodiment shown in FIG. 7A. Similarly, the quality factor information of the third signal component may be the quality factor of the third signal component or the index of the quality factor of the third signal component. Then, the response signal of the third signal component is obtained based on the quality factor information of the third signal component. When the quality factor information of the third signal component is the quality factor of the third signal component, a value of the quality factor of the third signal component is one of L. Alternatively, when the quality factor information of the third signal component is the index of the quality factor of the third signal component, a value range of the index of the quality factor of the first signal component is 0 to L-1 or 1 to L, where L is an integer greater than 1. L, M and N may be equal or unequal. This is not limited in this application.

When a joint feature map is transferred from the encoder side, the decoder side further needs to perform entropy decoding on the joint feature map, and obtain, through processing by a neural network, the feature map of the first signal component, the feature map of the second signal component, and the feature map of the third signal component.

In an embodiment, if the bitstream includes the index i of the quality factor of the Y component, the index j of the quality factor of the U component, and the index k of the quality factor of the V component, the decoder side needs to generate, through learning, a response signal matrix $\{g_{y1}, g_{y2}, \ldots g_{yi} \ldots g_{yN}\}$ of the first signal component, a response signal matrix $\{g_{u1}, g_{u2}, g_{uj} \ldots, g_{uM}\}$ of the second signal component, and a response signal matrix $\{g_{v1}, g_{v2}, \ldots, g_{vk} \ldots g_{vL}\}$ of the third signal component, where N, M, and L are integers greater than 1. Optionally, a response signal matrix $\{g_{y1}, g_{y2}, \ldots g_{yi} \ldots g_{yN}\}$ of the first signal component is obtained by taking a reciprocal of a control signal matrix $\{q_{y1}, q_{y2}, \ldots q_{yi} \ldots q_{yN}\}$ of the first signal component at the encoder side, a response signal matrix $\{g_{u1}, g_{u2}, \ldots g_{uj}, \ldots g_{uM}\}$ of the second signal component is obtained by taking a reciprocal of a control signal matrix $\{q_{u1}, q_{u2}, \ldots q_{ui} \ldots q_{uM}\}$ of the second signal component at the encoder side, and a response signal matrix $\{g_{v1}, g_{v2}, \ldots, g_{vk} \ldots g_{vL}\}$ of the third signal component is obtained by taking a reciprocal of a control signal matrix $\{q_{v1}, q_{v2}, \ldots q_{vi} \ldots q_{vL}\}$ of the third signal component at the encoder side, where N, M, and L are integers greater than 1. A response signal $g_{yi}$ of the first signal component is obtained based on the index i of the quality factor of the Y component. A response signal $g_{uj}$ of the second signal component is obtained based on the index j of the quality factor of the U component. A response signal $g_{vk}$ of the third signal component is obtained based on the index k of the quality factor of the V component.

In another embodiment, if the bitstream includes an index i of a quality factor of the video signal, the decoder side needs to generate, through learning, a response signal matrix $\{g_{c1}, g_{c2}, \ldots g_{ci} \ldots g_{cN}\}$ of the video signal, where c is 3 and represents the Y component, the U component, and the V component, and N is an integer greater than 1. Optionally, a response signal matrix $\{g_{c1}, g_{c2}, \ldots g_{ci} \ldots g_{cN}\}$ of the video signal is obtained by taking a reciprocal of a control signal matrix $\{q_{c1}, q_{c2}, \ldots q_{ci} \ldots q_{cN}\}$ of the video signal at the encoder side, where c is 3 and represents the Y component, the U component, and the V component, and N is an integer greater than 1. A response signal $g_{ci}$ that includes the first signal component, the second signal component, and the third signal component is obtained based on the index i of the quality factor of the video signal.

In still another embodiment, if the bitstream includes the quality factor of the first signal component, the quality factor of the second signal component, and the quality factor of the third signal component, the decoder side uses the quality factor of the Y component as an input into the fully-connected network, and outputs a response signal of the Y component; uses the quality factor of the U component as an input into the fully-connected network, and outputs a response signal of the U component; and uses the quality factor of the V component as an input into the fully-connected network, and outputs a response signal of the V component.

Reconstructed maps of the first signal component and the second signal component are obtained in a manner similar to that shown in FIG. 7A. Details are not described herein again.

In an embodiment, when the response signal includes a response vector, obtaining the reconstructed map of the third signal component based on the response signal of the third signal component and the feature map of the third signal component includes:

multiplying a response vector of the third signal component by the feature map of the third signal component, to obtain the reconstructed map of the third signal component, or multiplying the response vector of the third signal component by the feature map of the third signal component, and then obtaining, through processing by a neural network, the reconstructed map of the third signal component.

In another embodiment, when the response signal includes a response vector and an offset vector, obtaining the reconstructed map of the third signal component based on the response signal of the third signal component and the feature map of the third signal component includes:

multiplying a response vector of the third signal component by the feature map of the third signal component, and then adding an offset vector of the third signal component, to obtain the reconstructed map of the third signal component, or multiplying the response vector of the third signal component by the feature map of the third signal component, adding the offset vector of the third signal component, and then obtaining, through processing by a neural network, the reconstructed map of the third signal component.

In the embodiment in FIG. 7A, the UV component is processed as a combination. In FIG. 7D, the Y, U, and V components may be processed separately or processed, for example, as a combination of the Y and UV components, or another combination of the Y, U, and V components.

Figure 8A:
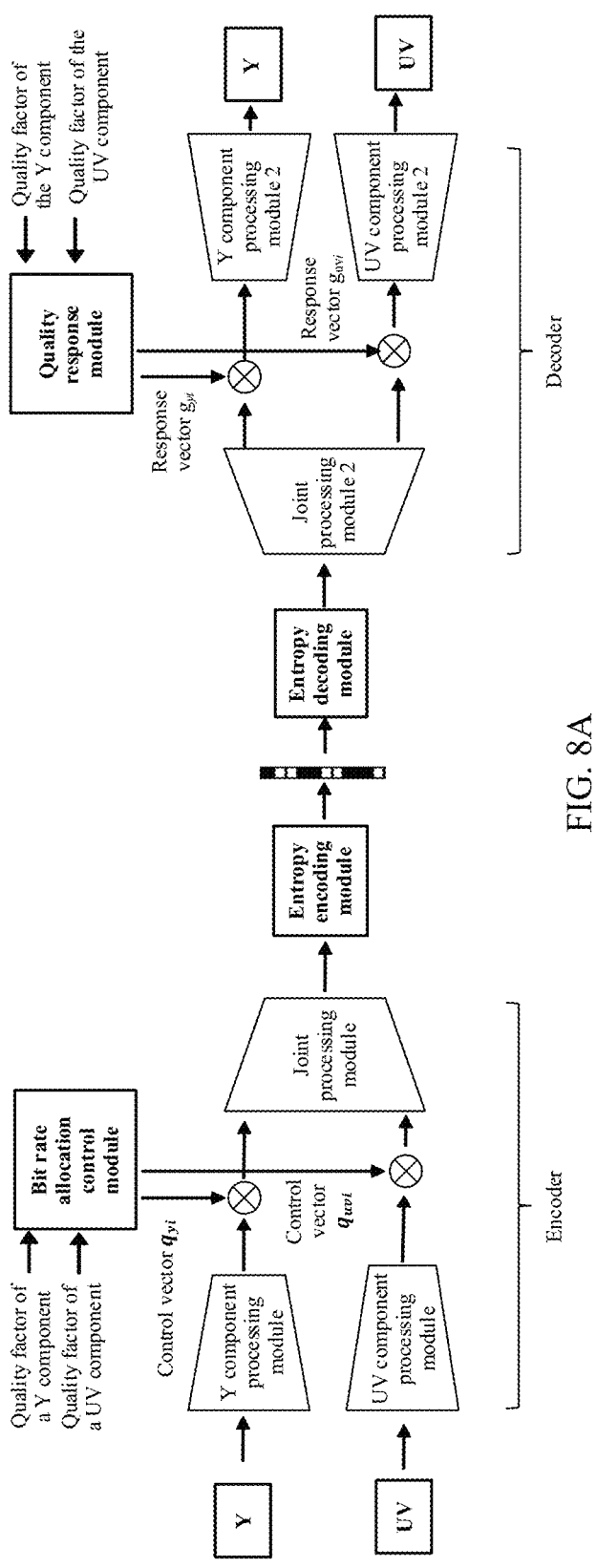
FIG. 8A is a schematic diagram of another scalable encoding and decoding structure according to an embodiment of this application.
Figure 8B:
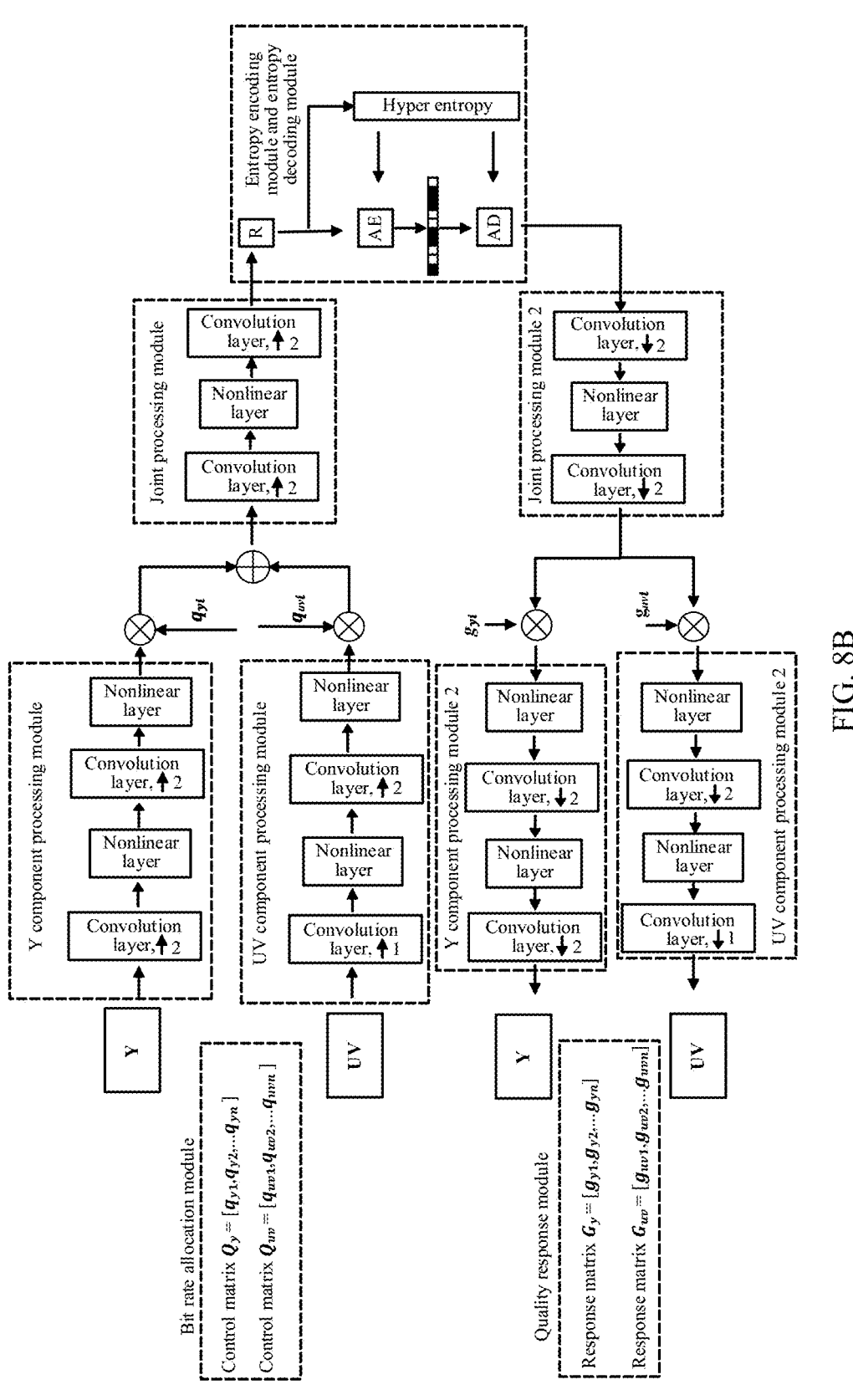
FIG. 8B is an embodiment of FIG. 8A.

FIG. 8A and FIG. 8B together provide a specific embodiment. FIG. 8A is an overall block diagram of a technical scheme according to this embodiment. A quality factor of a Y component and a quality factor of a UV component are input into a bit rate allocation control module. The module outputs a control vector $q_{yi}$ and a control vector $q_{uv1}$ that are respectively applied to a feature map of the Y component output by a Y component processing module and a feature map of the UV component output by a UV component processing module, to allocate bit rates of the Y and UV components.

A decoder side inputs the quality factor of the Y component and the quality factor of the UV component into a quality response module. The module outputs a control vector $g_{yi}$ and a control vector $g_{uvi}$ that are respectively applied to the feature map of the Y component and the feature map of the UV component, to implement respective quality gain responses of the Y and UV components.

In this embodiment, no limitation is imposed on a specific network structure of the Y component processing module, the UV component processing module, a joint processing module, a probability estimation module, a Y component processing module 2, a UV component processing module 2, and a joint processing module 2, to facilitate understanding of a specific example shown in FIG. 8B.

Operation 1: Obtain the Feature Maps of the Y and UV Components:

The Y and UV components are respectively input into the Y component processing module and the UV component processing module, and a network outputs the feature maps of the Y and UV components. In the example shown in FIG. 8B, the Y component processing module includes two convolution layers and two nonlinear layers. Downsampling factors in a horizontal direction and a vertical direction are 2 at the two convolution layers, and the Y component processing module outputs the feature map of the Y component. The UV component processing module includes two convolution layers and two nonlinear layers. Downsampling factors in a horizontal direction and a vertical direction are 1 at a first convolution layer, that is, no downsampling operation is performed. Downsampling factors in a horizontal direction and a vertical direction are 2 at a second convolution layer in the UV component processing module. The UV component processing module outputs the feature map of the UV component. After the foregoing processing by the network, for a YUV420 data format, a width and a height of the feature map of the Y component are the same as those of the feature map of the UV component.

Similar to a processing manner of the YUV420 data format, for a YUV444 data format and a YUV422 data format, a quantity of convolution layers and downsampling factors in a horizontal direction and a vertical direction are controlled, so that the width and the height of the feature map of the Y component are the same as those of the feature map of the UV component.

Operation 2: Input the quality factor of the Y component and the quality factor of the UV component into a bit rate allocation module to obtain a control vector $q_{yi}$ and a control vector $q_{uv1}$, multiply the control vector $q_{yi}$ and the control vector $q_{uv1}$ by the feature maps of the Y and UV components channel by channel, to obtain processed feature maps of the Y and UV components, add together or concatenate the processed feature maps of the Y and UV components, input added or concatenated processed feature maps into the joint processing module, and output a to-be-encoded feature map.

The bit rate allocation module includes control matrices $Q_y$ and $Q_{uv}$, and uses the quality factor of the Y component and the quality factor of the UV component as index values of the control matrices $Q_y$ and $Q_{uv}$, to obtain the control vector $q_{yi}$ and the control vector $q_{uvi}$ from indexes of $Q_y$ and $Q_{uv}$. The control matrices $Q_y$ and $Q_{uv}$ are obtained through learning by the network. The quality factor of the Y component and the quality factor of the UV component are any set values.

In the example shown in FIG. 8B, the control matrix $Q_y$ is a two-dimensional matrix with a size of K×N, the control matrix $Q_{uv}$ is a two-dimensional matrix with a size of L×M, and each element in the two matrices is a parameter that is learnable by the network. K represents a quantity of feature maps of the Y component, L represents a quantity of feature maps of the UV component, N represents N groups of candidate values of the quality factor of the Y component, and M represents M groups of candidate values of the quality factor of the UV component. For example, if N is 4 and M is 4, candidate values of the quality factor of the Y component are {0.5, 0.7, 0.8, 1.0}, and candidate values of the quality factor of the UV component are {0.15, 0.2, 0.25, 0.3}.

Operation 3: Input the to-be-encoded feature map into an entropy encoding module, and output a bitstream. In the example shown in FIG. 8B, the to-be-encoded feature map is input into an encoded feature map hyper entropy module, to output a probability distribution of a to-be-encoded symbol. Arithmetic encoding is performed based on the probability distribution of the to-be-encoded symbol, and the bitstream is output. In addition, information about the quality factor of the Y component and the quality factor of the UV component are written into the bitstream.

The information about the quality factor of the Y component and the quality factor of the UV component may be expressed and written into the bitstream in the following three manners:

Manner 1: A quantity of candidate values and the candidate values of the quality factor of the Y component, and a quantity of candidate values and the candidate values of the quality factor of the UV component are predefined, and index numbers in respective candidate lists of the quality factor of the Y component and the quality factor of the UV component are transferred to the decoder side. For example, if N is 4 and M is 3, candidate values of the quality factor of the Y component are {0.5, 0.7, 0.8, 1.0}, and candidate values of the quality factor of the UV component are {0.15, 0.2, 0.25}. An index number i of the Y component and an index number j of the UV component are written into the bitstream, where values of i and j are 0, 1, 2, and 3. When i is 1, it indicates that the quality factor of the Y component is 0.7, and when j is 0, it indicates that the quality factor of the UV component is 0.15.

Manner 2: A quantity of candidate values and the candidate values after the quality factor of the Y component and the quality factor of the UV component are combined are predefined. For example, the quantity of candidate values of a combination value of the quality factors of the Y and UV components is 6, and the candidate list is {(0.5, 0.25), (0.7, 0.15), (0.7, 0.25), (0.8, 0.1), (0.8, 0.2), and (1.0, 0.2)}. The index number i is written into the bitstream, and values of i are 0, 1, 2, 3, 4, and 5. When i is 1, it indicates that the quality factors of the Y and UV components are (0.7, 0.15).

Manner 3: The quality factor of the Y component and the quality factor of the UV component are directly written into the bitstream and transferred to the decoder side. For example, (1.0, 0.2) is written into the bitstream.

Operation 4: Input the bitstream into an entropy decoding module, and perform arithmetic decoding to obtain a feature map, the quality factor of the Y component, and the quality factor of the UV component. In the example shown in FIG. 8B, arithmetic decoding is performed based on the probability distribution estimated by the hyper entropy module.

Operation 5: Obtain a feature map through decoding, input the feature map to the joint processing module 2, output a feature map whose quantity of channels is M, and divide the feature map whose quantity of channels is M into a feature map of the Y component whose quantity of channels is K and a feature map of the UV component whose quantity of channels is L. In this division scheme, K≤M and L≤M. When K=L=M, it indicates that the feature map of the Y component is the same as the feature map of the UV component, and both are feature maps with M channels. In the example shown in FIG. 8B, the joint processing module 2 includes two convolution layers and one nonlinear layer.

Operation 6: Input the quality factor of the Y component and the quality factor of the UV component into the quality response module to obtain a response vector $g_{yi}$ and a response vector $g_{uvi}$, and multiply the response vector $g_{yi}$ and the response vector $g_{uvi}$ by the feature maps of the Y and UV components channel by channel to obtain the feature maps of the Y and UV components after quality gains. The feature maps of the Y and UV components after quality gains are respectively input into the Y component processing module 2 and the UV component processing module 2 to output a reconstructed map of the Y component and a reconstructed map of the UV component.

The quality response module includes response matrices $G_y$ and $G_{uv}$, and uses the quality factor of the Y component and the quality factor of the UV component that are obtained through decoding as index values of the response matrices $G_y$ and $G_{uv}$, to obtain the response vector $g_{yi}$ and the response vector $g_{uvi}$ from indexes of $G_y$ and $G_{uv}$.

The response matrices $G_y$ and Guy are obtained through learning by the network. In the example shown in FIG. 8B, the response matrix $G_y$ is a two-dimensional matrix with a size of K×N, the response matrix Guy is a two-dimensional matrix with a size of L×M, and each element in the two matrices is a parameter that is learnable by the network. K represents a quantity of feature maps of the Y component, L represents a quantity of feature maps of the UV component, N represents N groups of candidate values of the quality factor of the Y component, and M represents M groups of candidate values of the quality factor of the UV component.

Optionally, the response matrices $G_y$ and Guy are respectively obtained by taking reciprocals of the control matrices $Q_y$ and $Q_{uv}$.

In this embodiment, training and learning are performed on the network modules and the control matrix parameters in operation 1 to operation 7. Specifically, in this application, an adaptive moment estimation (Adaptive Moment Estimation, Adam) optimization algorithm is used to perform optimization training on a neural network, and an ImgeNet dataset is a training data set. Because this network structure is oriented to picture coding, an objective of training optimization is to minimize a bit rate-distortion joint loss function, and a function expression of the function is as follows:

$$R+\lambda(w_yD_y+w_uD_u+w_vD_v)=E[-\log_2p(y)]+\lambda w_yE\|x_y-x_y'\|_2+\lambda w_uE\|x_u-x_u'\|_2+\lambda w_vE\|x_v-x_v'\|_2$$

p(y) represents a probability distribution estimated by a probability estimator, $x_y$ is an original value of the Y component, $x_y'$ is a reconstructed map of the Y component, $x_u$ is an original value of the U component, $x_u'$ is a reconstructed map of the U component, $x_v$ is an original value of the V component, $x_v'$ is a reconstructed map of the V component, $w_y$ is a quality factor of the Y component, $w_u$ is a quality factor of the U component, and $w_v$ is a quality factor of the V component. λ is a constant and matches a target bit rate.

For example, N is 4, candidate values of quality factors of the Y, U, and V components ($w_y$, $w_u$, $w_v$) are {(0.5, 0.25, 0.25), (0.7, 0.4, 0.4), (0.8, 0.1, 0.1), and (1.0, 0.2, 0.2)}. During training by the network, an index number i of a weight group is randomly selected from {0, 1, 2, 3}. A weight value group ($w_{yi}$, $w_{ui}$, $w_{vi}$), a to-be-learned control vector $q_{yi}$, and a to-be-learned control vector $q_{uvi}$ are determined based on i, and training and learning are performed on the network modules and the control matrix parameters based on the training objective.

When the joint processing module and/or the joint processing module 2 and/or the quality response module are/is removed from the codec provided in this embodiment, this is still applicable to other embodiments of this application.

This embodiment provides a technical solution in which the Y, U, and V components are combined into the Y and UV components. For other combinations of the Y, U, and V components, for example, {YU, V} and {YV, U}, a solution idea of this application is still applicable.

Similarly, the UV component is further divided into the U component and the V component for processing, and the solution idea of this application is still applicable.

In conventional end-to-end picture coding, during learning and optimization of a specific network, optimization is performed based on fixed weight values of Y, U, and V components. Therefore, proportions of bit rates of Y, U, and V components are fixed. Because different pictures have different color characteristics, fixed bit rate allocation causes poor encoding performance of some video pictures. A plurality of models may be simply trained based on a plurality of groups of different weight values of the Y, U, and V components, to implement different allocation of bit rates of the Y, U, and V components. However, this increases a quantity of models, and training the plurality of models consumes a large quantity of computing resources and time. Compared with the conventional technology, in this application, control vectors are obtained through learning by a network based on derived weight values of the Y, U, and V components, and distortion control is performed on feature maps of the Y and UV components to different degrees based on the control vectors, to implement bit rate allocation of the Y and UV components. Therefore, this application has the following advantages:

(1) Bit rate allocation among Y, U, and V components is supported to adapt to pictures having different color characteristics.

(2) Time required for training a plurality of models and a quantity of new network parameters of the models are reduced.

Figure 9A:
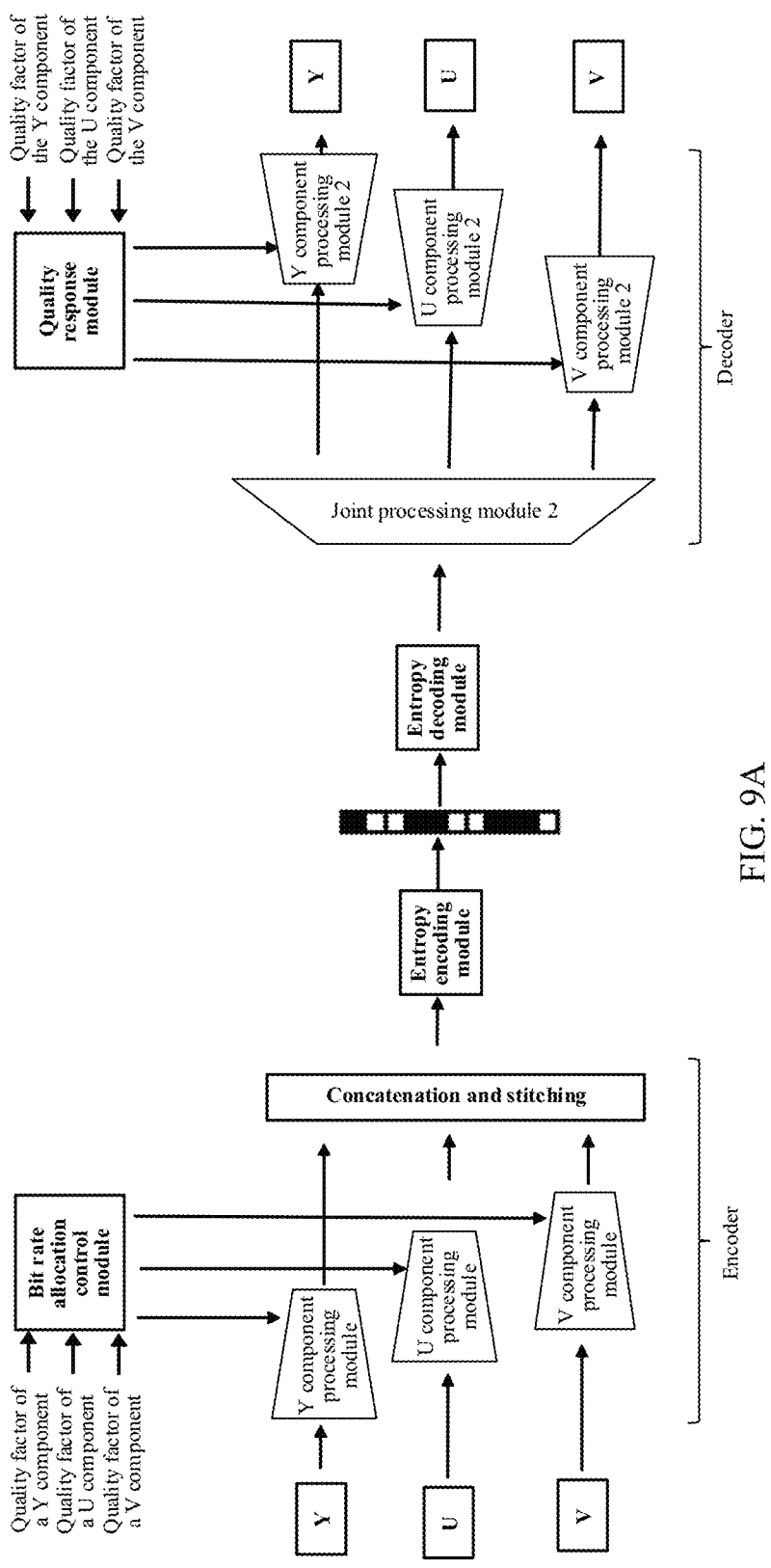
FIG. 9A is a schematic diagram of still another scalable encoding and decoding structure according to an embodiment of this application.
Figure 9B:
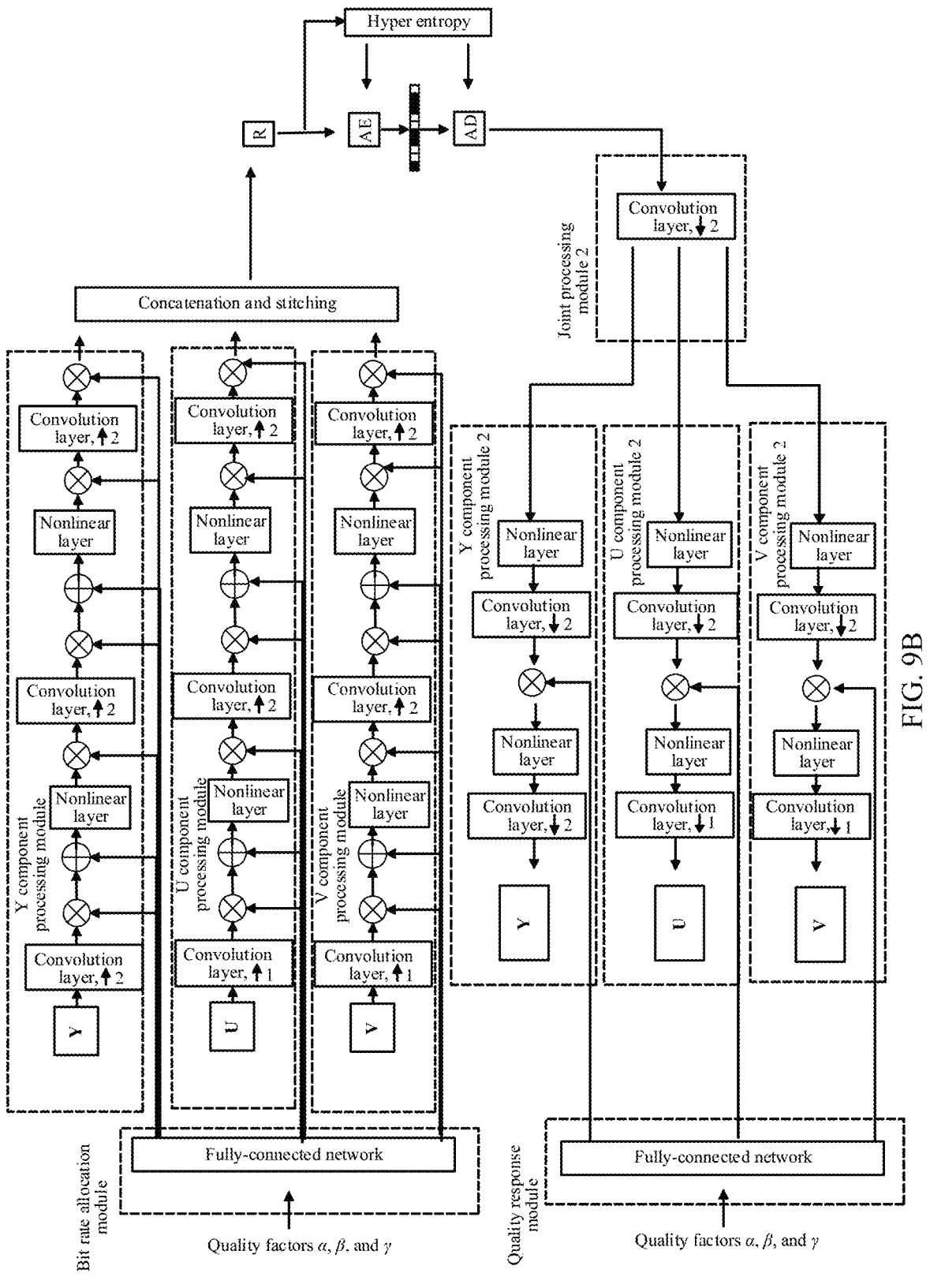
FIG. 9B is an embodiment of FIG. 9A.

FIG. 9A and FIG. 9B together provide a specific embodiment. In this embodiment, as shown in FIG. 9A and FIG. 9B, a U component processing module and a V component processing module are used to respectively process U component data and V component data. In this embodiment, a quality factor of a Y component, a quality factor of a U component, and a quality factor of a V component are used as inputs into a bit rate allocation control module, and a control signal is output to process a feature map at any layer in a Y component processing module, the U component processing module, and the V component processing module, to implement bit rate allocation among the Y, U, and V components. A decoder side uses the quality factor of the Y component, the quality factor of the U component, and the quality factor of the V component as inputs into a quality response module, and a control signal is output to perform a quality gain response on a feature map at any layer in the Y component processing module, the U component processing module, and the V component processing module. In this application, no limitation is imposed on a specific network structure of the bit rate allocation control module, the quality response module, the Y component processing module, the U component processing module, a joint processing module, a Y component processing module 2, a U component processing module 2, a V component processing module 2, a joint processing module 2, an entropy encoding module, and an entropy decoding module, to facilitate understanding of a specific example shown in FIG. 9A.

In an example shown in FIG. 9B, Operation 1: Input the quality factor of the Y component, the quality factor of the U component, and the quality factor of the V component into the bit rate allocation control module. The module includes a fully-connected network, and outputs a control signal: a control vector and an offset vector.

Operation 2: Respectively input to-be-encoded Y, U, and V signals input into the Y component processing module, the U component processing module, and the V component processing module. For example, in the Y component processing module, a feature map output at each convolution layer is multiplied by a control vector corresponding to the feature map channel by channel, and then an offset vector corresponding to the feature map is added channel by channel. The feature map output at a nonlinear layer in the module is multiplied by the corresponding control vector channel by channel. A feature map output at each layer of the network in the Y component processing module is processed based on the control signal output by the bit rate control module. Processing of the U and V components is similar to that of the Y component.

FIG. 9B is a schematic diagram of a specific network structure. Network structures of the Y component processing module, the U component processing module, and the V component processing module are the same except first convolution layers. For a YUV422 format, downsampling factors in a horizontal direction and a vertical direction are 2 at a first convolution layer in the Y component processing module. A downsampling factor in a horizontal direction is 1 at first convolution layers in the U component processing module and the V component processing module, that is, no downsampling operation is performed. A downsampling factor is 2 in a vertical direction. For a YUV420 format, downsampling factors in a horizontal direction and a vertical direction are 2 at a first convolution layer in the Y component processing module. Downsampling factors in a horizontal direction and a vertical direction are 1 at first convolution layers in the U component processing module and the V component processing module, that is, no downsampling operation is performed.

Operation 3: Concatenate and stitch a feature map of the Y component, a feature map of the U component, and a feature map of the V component to form a to-be-encoded feature map, input the to-be-encoded feature map to the entropy encoding module, and output a bitstream. In the example shown in FIG. 9B, the to-be-encoded feature map is input into an encoded feature map hyper entropy module, to output a probability distribution of a to-be-encoded symbol. Arithmetic encoding is performed based on the probability distribution of the to-be-encoded symbol, and the bitstream is output. In addition, information about the quality factor of the Y component, the quality factor of the U component, and the quality factor of the V component are written into the bitstream.

Operation 4: Input the bitstream into the entropy decoding module, and perform arithmetic decoding to obtain a feature map and the information about the quality factor of the Y component, the quality factor of the U component, and the quality factor of the V component. In the example shown in FIG. 9B, arithmetic decoding is performed based on the probability distribution estimated by the hyper entropy module.

Operation 5: Input the feature map obtained through decoding into the joint processing module 2, and output feature maps.

Operation 6: Input the quality factor of the Y component, the quality factor of the U component, and the quality factor of the V component into the quality response module to obtain a response vector $g_{yi}$, a response vector $g_{ui}$, and a response vector $g_{yi}$. The response vector $g_{yi}$ is multiplied by a feature map output at a second convolution layer in the Y component processing module 2 channel by channel, to obtain a feature map after a quality gain. Processing processes for the U and V components are similar. The Y component processing module 2, the U component processing module 2, and the V component processing module 2 output reconstructed maps of the Y, U, and V components.

The quality factor of the Y component, the quality factor of the U component, and the quality factor of the V component are input into the quality response module. The module includes a fully-connected network, and outputs a response vector $g_{yi}$, a response vector $g_{ui}$, and a response vector $g_{vi}$.

Optionally, similar to a response vector obtaining manner in an embodiment 1, the quality response module includes response matrices $G_y$, $G_{uv}$, and $G_y$, and uses the quality factor of the Y component, the quality factor of the U component, and the quality factor of the V component that are obtained through decoding as index values of the response matrices $G_y$, $G_{uv}$, and $G_y$, to obtain a response vector $g_{yi}$, a response vector $g_{ui}$, and a response vector $g_{yi}$ from indexes of $G_y$, $G_{uv}$, and $G_v$. The response matrices $G_y$, $G_{uv}$, and $G_v$ are obtained through learning by the network.

The training process of the network is similar to that in the embodiment in FIG. 8A and FIG. 8B, and details are not described again.

In this embodiment, the control signals are applied to feature maps output at each layer of the network in the Y component processing module, the U component processing module, and the V component processing module. Optionally, the control signals are applied to only some feature maps output by the network in the Y component processing module, the U component processing module, and the V component processing module.

In this embodiment, the response signals are applied to only feature maps output at an intermediate layer of the network in the Y component processing module, the U component processing module, and the V component processing module. Optionally, the control signals are applied on feature maps output at any one or more layers of the network in the Y component processing module, the U component processing module, and the V component processing module.

When the joint processing module 2 and/or the quality response module are/is removed from the codec provided in this embodiment, the technology of this application is still applicable.

When the joint processing module is added to the codec provided in this embodiment, the technology of this application is still applicable.

This embodiment provides a technical solution in which the Y, U, and V components are separately processed as three components. For other combinations of the Y, U, and V components, for example, {YU, V}, {YV, U}, and {Y, UV}, a solution idea of the technology of this application is still applicable.

According to the descriptions in the foregoing embodiments, in this application, in the present application, quality factors of Y, U, and V components are input into a bit rate allocation control module, and control signals output by the module are separately applied to feature maps of different components, to implement bit rate allocation of different components. The different components may refer to three components: Y, U, and V components, or two components: Y and UV components, or another combination of Y, U, and V components.

Optionally, the control signal indicates a control vector $q_i$, and is generated based on a quality factor of each different component. A weight matrix $\{q_{c1}, q_{c2} \ldots, q_{CN}\}$ of a same component is obtained through learning by a network, where c is 2 or 3 and represents a quantity of different components, and N is a quantity of candidate values of the quality factor. During use, a control vector $q_{ci}$ corresponding to each different component is obtained based on an index of the quality factor of each different component.

Optionally, the control signal indicates a control vector q and an offset vector b. A quality factor of each different component is used as an input into a fully-connected network, and a control vector q and an offset vector b corresponding to the different component is output.

Therefore, embodiments provided in this application can:

(1) adapt to pictures having different color characteristics and supports bit rate allocation among Y, U, and V components based on control vectors.

(2) reduce time required for training a plurality of models and a quantity of new network parameters of the models.

Figures 10, 11:
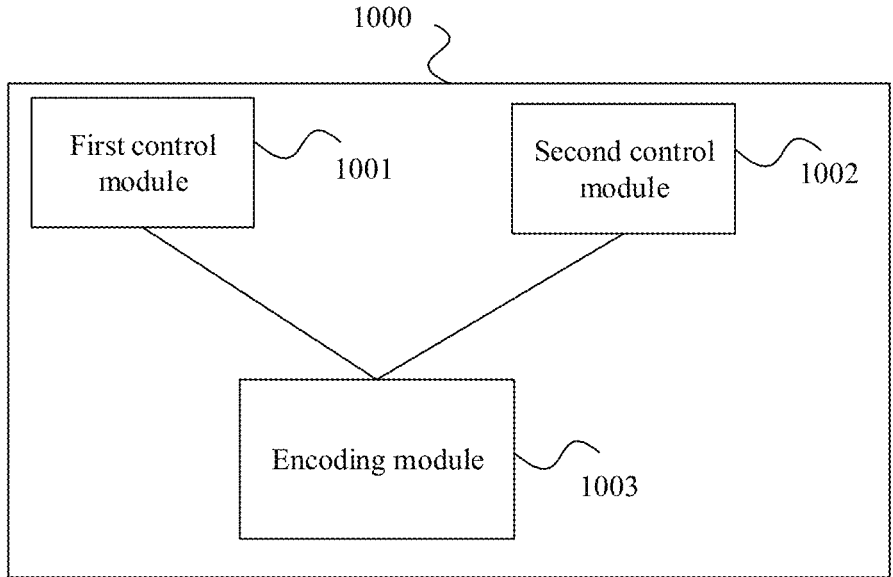
FIG. 10 is a schematic diagram of a structure of an encoding apparatus 1000 according to an embodiment of this application.
FIG. 11 is a schematic diagram of a structure of a decoding apparatus 1100 according to an embodiment of this application.

FIG. 10 is a schematic diagram of a structure of an encoding apparatus 1000 according to an embodiment of this application. The encoding apparatus may correspond to the video encoder 20. The encoding apparatus 1000 includes a first control module 1001, a second control module 1002, and an encoding module 1003. The first control module 1001 is configured to apply a control signal of a first signal component of a video signal to a first feature map of the first signal component, to obtain a second feature map of the first signal component, where the control signal of the first signal component is obtained through learning. The second control module 1002 is configured to apply a control signal of a second signal component of the video signal to a first feature map of the second signal component, to obtain a second feature map of the second signal component, where the control signal of the second signal component is obtained through learning. The encoding module 1003 is configured to obtain a bitstream of the video signal based on the second feature map of the first signal component and the second feature map of the second signal component. The encoding apparatus 1000 may further include the bit rate allocation control module described in the foregoing embodiments. The encoding apparatus 1000 is configured to implement the encoding method described in the foregoing embodiments. For detailed functions, refer to the descriptions in the foregoing embodiments, and details are not described herein again.

FIG. 11 is a schematic diagram of a structure of a decoding apparatus 1100 according to an embodiment of this application. The decoding apparatus 1100 may correspond to the video decoder 30. The decoding apparatus 1100 includes a decoding module 1101, a first control module 1102, a second control module 1103, and a reconstruction module 1104. The decoding module 1101 is configured to: obtain a bitstream of a video signal, and perform entropy decoding on the bitstream to obtain a feature map of a first signal component of the video signal and a feature map of a second signal component of the video signal. The first control module 1102 is configured to obtain a reconstructed map of the first signal component based on a response signal of the first signal component and the feature map of the first signal component, where the response signal of the first signal component is obtained through learning. The second control module 1103 is configured to obtain a reconstructed map of the second signal component based on a response signal of the second signal component and the feature map of the second signal component, where the response signal of the second signal component is obtained through learning. The reconstruction module 1104 is configured to reconstruct the video signal based on the reconstructed map of the first signal component and the reconstructed map of the second signal component. The decoding apparatus 1100 may further include the quality response module described in the foregoing embodiments. The decoding apparatus 1100 is configured to implement the decoding method described in the foregoing embodiments. For detailed functions, refer to the descriptions in the foregoing embodiments, and details are not described herein again.

A person skilled in the art can appreciate that functions described with reference to various illustrative logical blocks, modules, and algorithm steps disclosed and described herein may be implemented by hardware, software, firmware, or any combination thereof. If implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, and the discs reproduce data optically by using lasers. Combinations of the above should also be included within the scope of the computer-readable medium.

Instructions may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video signal decoding method, comprising:
obtaining a bitstream of a video signal;
performing entropy decoding on the bitstream to obtain a feature map of a first signal component of the video signal and a feature map of a second signal component of the video signal, wherein the first signal component is a Y component, and the second signal component is a UV component;
obtaining a reconstructed map of the first signal component based on a response signal of the first signal component and the feature map of the first signal component, wherein the response signal of the first signal component is obtained through learning;
obtaining a reconstructed map of the second signal component based on a response signal of the second signal component and the feature map of the second signal component, wherein the response signal of the second signal component is obtained through learning; and
reconstructing the video signal based on the reconstructed map of the first signal component and the reconstructed map of the second signal component.

2. The method according to claim 1, further comprising:
obtaining the response signal of the first signal component based on quality factor information of the first signal component, wherein the bitstream further comprises the quality factor information of the first signal component and quality factor information of the second signal component, the quality factor information of the first signal component includes a quality factor of the first signal component or an index of the quality factor of the first signal component, the quality factor information of the second signal component includes a quality factor of the second signal component or an index of the quality factor of the second signal component; and
obtaining the response signal of the second signal component based on the quality factor information of the second signal component.

3. The method according to claim 2, wherein when the quality factor information of the first signal component includes the quality factor of the first signal component, a value of the quality factor of the first signal component is one of N, or when the quality factor information of the first signal component includes the index of the quality factor of the first signal component, a value range of the index of the quality factor of the first signal component is 0 to N-1 or 1 to N, wherein N is an integer greater than 1; and
when the quality factor information of the second signal component includes the quality factor of the second signal component, a value of the quality factor of the second signal component is one of M, or when the quality factor information of the second signal component includes the index of the quality factor of the second signal component, a value range of the index of the quality factor of the second signal component is 0 to M-I or I to M, wherein M is an integer greater than 1.

4. The method according to claim 1, further comprising:
when the bitstream comprises a joint feature map, performing entropy decoding on the joint feature map, and obtaining, through processing by a neural network, the feature map of the first signal component and the feature map of the second signal component.

5. The method according to claim 1, further comprising:
when the bitstream comprises an index i of a quality factor of the Y component and an index j of a quality factor of the UV component, generating, through learning, a response signal matrix $\{g_{y1}, g_{y2}, \ldots, g_{yi} \ldots g_{yN}\}$ of the first signal component and a response signal matrix $\{g_{uv1}, g_{uv2}, \ldots g_{uvj}, \ldots g_{uvM}\}$ of the second signal component, wherein N and M are integers greater than 1;

obtaining a response signal $g_{yi}$ of the first signal component based on the index i of the quality factor of the Y component; and obtaining a response signal $g_{uvj}$ of the second signal component based on the index j of the quality factor of the UV component.

6. The method according to claim 1, further comprising:

when the bitstream comprises an index i of a quality factor of the video signal, generating, through learning, a response signal matrix $\{g_{c1}, g_{c1}, \ldots g_{ci} \ldots g_{cN}\}$ of the video signal, wherein c is 2 and represents the Y component and the UV component, and N is an integer greater than 1; and obtaining, based on the index i of the quality factor of the video signal, a response signal $g_{ci}$ that comprises the first signal component and the second signal component.

7. The method according to claim 1, wherein the obtaining a reconstructed map of the first signal component based on a response signal of the first signal component and the feature map of the first signal component comprises:

when the response signal comprises a response vector, multiplying a response vector of the first signal component by the feature map of the first signal component, to obtain the reconstructed map of the first signal component, or multiplying the response vector of the first signal component by the feature map of the first signal component, and then obtaining, through processing by a neural network, the reconstructed map of the first signal component; and the obtaining a reconstructed map of the second signal component based on a response signal of the second signal component and the feature map of the second signal component comprises:

multiplying a response vector of the second signal component by the feature map of the second signal component, to obtain the reconstructed map of the second signal component, or multiplying the response vector of the second signal component by the feature map of the second signal component, and then obtaining, through processing by a neural network, the reconstructed map of the second signal component.

8. A decoder, comprising:

one or more processors; and a computer-readable storage medium, coupled to the one or more processors and storing a program for execution by the one or more processors, wherein the program, when executed by the one or more processors, configures the decoder to:

obtain a bitstream of a video signal;

perform entropy decoding on the bitstream to obtain a feature map of a first signal component of the video signal and a feature map of a second signal component of the video signal, wherein the first signal component is a Y component, and the second signal component is a UV component;

obtain a reconstructed map of the first signal component based on a response signal of the first signal component and the feature map of the first signal component, wherein the response signal of the first signal component is obtained through learning;

obtain a reconstructed map of the second signal component based on a response signal of the second signal component and the feature map of the second signal component, wherein the response signal of the second signal component is obtained through learning; and reconstruct the video signal based on the reconstructed map of the first signal component and the reconstructed map of the second signal component.

9. The decoder according to claim 8, wherein the bitstream further comprises quality factor information of the first signal component and quality factor information of the second signal component, the quality factor information of the first signal component includes a quality factor of the first signal component or an index of the quality factor of the first signal component, the quality factor information of the second signal component includes a quality factor of the second signal component or an index of the quality factor of the second signal component, wherein the program, when executed by the one or more processors, further configures the decoder to:

obtain the response signal of the first signal component based on the quality factor information of the first signal component; and obtain the response signal of the second signal component based on the quality factor information of the second signal component.

10. The decoder according to claim 9, wherein when the quality factor information of the first signal component includes the quality factor of the first signal component, a value of the quality factor of the first signal component is one of N, or when the quality factor information of the first signal component includes the index of the quality factor of the first signal component, a value range of the index of the quality factor of the first signal component is 0 to N-1 or 1 to N, wherein N is an integer greater than 1; and when the quality factor information of the second signal component includes the quality factor of the second signal component, a value of the quality factor of the second signal component is one of M, or when the quality factor information of the second signal component includes the index of the quality factor of the second signal component, a value range of the index of the quality factor of the second signal component is 0 to M-1 or 1 to M, wherein M is an integer greater than 1.

11. The decoder according to claim 8, wherein the bitstream comprises a joint feature map, and the program, when executed by the one or more processors, further configures the decoder to:

perform entropy decoding on the joint feature map, and obtain, through processing by a neural network, the feature map of the first signal component and the feature map of the second signal component.

12. The decoder according to claim 8, wherein if the bitstream comprises an index i of a quality factor of the Y component and an index j of a quality factor of the UV component, wherein the program, when executed by the one or more processors, further configures the decoder to:

generate, through learning, a response signal matrix $\{g_{y1}, g_{y2}, \ldots g_{yi} \ldots g_{yN}\}$ of the first signal component and a response signal matrix $\{g_{uv1}, g_{uv2}, \ldots g_{uvj}, \ldots g_{uvM}\}$ of the second signal component, wherein N and M are integers greater than 1;

obtain a response signal $g_{yi}$ of the first signal component based on the index i of the quality factor of the Y component; and obtain a response signal $g_{uv1}$ of the second signal component based on the index j of the quality factor of the UV component.

13. The decoder according to claim 8, wherein if the bitstream comprises an index i of a quality factor of the video signal, wherein the program, when executed by the one or more processors, further configures the decoder to:

generating, through learning, a response signal matrix $\{g_{c1}, g_{c2}, \ldots g_{ci} \ldots g_{cN}\}$ of the video signal, wherein c is 2 and represents the Y component and the UV component, and N is an integer greater than 1; and obtaining, based on the index i of the quality factor of the video signal, a response signal $g_{ci}$ that comprises the first signal component and the second signal component.

14. The decoder according to claim 8, wherein when the response signal comprises a response vector, the obtaining a reconstructed map of the first signal component based on a response signal of the first signal component and the feature map of the first signal component comprises:

multiplying a response vector of the first signal component by the feature map of the first signal component, to obtain the reconstructed map of the first signal component, or multiplying the response vector of the first signal component by the feature map of the first signal component, and then obtaining, through processing by a neural network, the reconstructed map of the first signal component; and the obtaining a reconstructed map of the second signal component based on a response signal of the second signal component and the feature map of the second signal component comprises:

multiplying a response vector of the second signal component by the feature map of the second signal component, to obtain the reconstructed map of the second signal component, or multiplying the response vector of the second signal component by the feature map of the second signal component, and then obtaining, through processing by a neural network, the reconstructed map of the second signal component.

15. A non-transitory computer-readable storage medium, comprising program code, wherein when the program code is executed by a computer device, the program code is used to perform operations:

obtaining a bitstream of a video signal;

performing entropy decoding on the bitstream to obtain a feature map of a first signal component of the video signal and a feature map of a second signal component of the video signal, wherein the first signal component is a Y component, and the second signal component is a UV component;

obtaining a reconstructed map of the first signal component based on a response signal of the first signal component and the feature map of the first signal component, wherein the response signal of the first signal component is obtained through learning;

obtaining a reconstructed map of the second signal component based on a response signal of the second signal component and the feature map of the second signal component, wherein the response signal of the second signal component is obtained through learning; and reconstructing the video signal based on the reconstructed map of the first signal component and the reconstructed map of the second signal component.

16. The non-transitory computer-readable storage medium according to claim 15, wherein the bitstream further comprises quality factor information of the first signal component and quality factor information of the second signal component, the quality factor information of the first signal component includes a quality factor of the first signal component or an index of the quality factor of the first signal component, the quality factor information of the second signal component includes a quality factor of the second signal component or an index of the quality factor of the second signal component, and the program code is used to further perform operations:

obtaining the response signal of the first signal component based on the quality factor information of the first signal component; and obtaining the response signal of the second signal component based on the quality factor information of the second signal component.

17. The non-transitory computer-readable storage medium according to claim 16, wherein when quality factor information of the first signal component is includes a quality factor of the first signal component, a value of the quality factor of the first signal component is one of N, or when the quality factor information of the first signal component includes the index of the quality factor of the first signal component, a value range of the index of the quality factor of the first signal component is 0 to N-1 or 1 to N, wherein N is an integer greater than 1; and when quality factor information of the second signal component includes a quality factor of the second signal component, a value of the quality factor of the second signal component is one of M, or when the quality factor information of the second signal component includes the index of the quality factor of the second signal component, a value range of the index of the quality factor of the second signal component is 0 to M-1 or 1 to M, wherein M is an integer greater than 1.

* * * * *